(12) United States Patent
Paulus et al.

(10) Patent No.: US 11,748,338 B1
(45) Date of Patent: Sep. 5, 2023

(54) AUTO REFRESH OF DIRECTORY TABLES FOR STAGES

(71) Applicant: Snowflake Inc., Bozeman, MT (US)

(72) Inventors: Polita Paulus, Kirkland, WA (US); Aravind Ramarathinam, Sammamish, WA (US); Saurin Shah, Kirkland, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/822,381

(22) Filed: Aug. 25, 2022

Related U.S. Application Data

(60) Provisional application No. 63/366,192, filed on Jun. 10, 2022.

(51) Int. Cl.
  *G06F 16/23*    (2019.01)
  *G06F 16/22*    (2019.01)
(52) U.S. Cl.
  CPC ...... *G06F 16/2379* (2019.01); *G06F 16/2282* (2019.01); *G06F 16/2358* (2019.01)
(58) Field of Classification Search
  CPC ............. G06F 16/2379; G06F 16/2282; G06F 16/2358
  See application file for complete search history.

(56) References Cited

U.S. PATENT DOCUMENTS

| | | | |
|---|---|---|---|
| 10,715,524 B1* | 7/2020 | Paulus | G06F 21/6218 |
| 10,997,243 B1* | 5/2021 | Paulus | G06F 16/24568 |
| 2014/0337291 A1* | 11/2014 | Dorman | G06F 16/162 |
| | | | 707/634 |
| 2019/0108419 A1* | 4/2019 | Coven | H04L 12/1831 |
| 2019/0163754 A1* | 5/2019 | Huang | G06F 16/2255 |
| 2022/0321396 A1* | 10/2022 | Singh | H04L 41/0622 |

* cited by examiner

*Primary Examiner* — Robert W Beausoliel, Jr.
*Assistant Examiner* — Mohammad S Bhuyan
(74) *Attorney, Agent, or Firm* — Schwegman Lundberg & Woessner, P.A.

(57) ABSTRACT

In one aspect, a method includes forming, at a database platform, a file stage in a user account on the database platform, the user account being associated with a client, forming, at the database platform, a hidden stage directory table and a data pipeline for the file stage, and binding the data pipeline to the file stage. The method also includes receiving a notification of an event of the file stage. The method also includes identifying the data pipeline corresponding to the file stage. The method also includes updating the hidden stage directory table of the identified data pipeline.

20 Claims, 15 Drawing Sheets

AUTO REFRESH OF DIRECTORY TABLES FOR STAGES

The present application claims priority to U.S. Provisional Patent Application Ser. No. 63/366,192, filed Jun. 10, 2022, which is hereby incorporated by reference in its entirety.

TECHNICAL FIELD

The present disclosure relates to database platforms and, more particularly, to systems and methods for refreshing directory tables of internal stages at a database platform.

BACKGROUND

Database platforms are widely used for data storage and data access in computing and communication contexts. With respect to architecture, a database platform could be an on-premises database platform, a network-based database platform (e.g., a cloud-based database platform), a combination of the two, and/or include another type of architecture. With respect to type of data processing, a database platform could implement online transactional processing (OLTP), online analytical processing (OLAP), a combination of the two, and/or another type of data processing. Moreover, a database platform could be or include a relational database management system (RDBMS) and/or one or more other types of database management systems.

In a typical implementation, a database platform includes one or more databases that are maintained on behalf of a customer account. Indeed, a database platform may include one or more databases that are respectively maintained in association with any number of customer accounts, as well as one or more databases associated with one or more system (e.g., administrative) accounts of the database platform, one or more other databases used for administrative purposes, and/or one or more other databases that are maintained in association with one or more other organizations and/or for any other purposes. A database platform may store metadata in association with the database platform in general and in association with particular databases and/or particular customer accounts as well. Metadata that is maintained by a database platform with respect to stored data (e.g., stored customer data) may be referred to herein at times as "expression properties."

Users and/or executing processes—that may be associated with, e.g., a given customer account—may, via one or more types of clients (e.g., web interfaces, Java Database Connectivity (JDBC) drivers, Open Database Connectivity (ODBC) drivers, desktop applications, mobile apps, and/or the like), be able to cause data to be ingested into one or more databases in the database platform, and may also be able to manipulate the data, run queries against the data, create customized materialized views of the data, modify the data, insert additional data, remove data, and/or the like. In an example implementation of a database platform, a given database is represented as an account-level database object within a customer account, and the customer account may also include one or more other account-level database objects such as users, roles, and/or the like. Furthermore, a given account-level database object may itself contain one or more database objects such as tables, schemas, materialized views, streams, tasks, and/or the like. A given table may be organized as records (e.g., rows) that each include one or more attributes (e.g., columns). A database platform may physically store database data in multiple storage units, which may be referred to as blocks, micro-partitions, and/or by one or more other names.

BRIEF DESCRIPTION OF THE DRAWINGS

A more detailed understanding may be had from the following description, which is presented by way of example in conjunction with the following drawings, in which like reference numerals are used across the drawings in connection with like elements.

DETAILED DESCRIPTION

Introduction

Figure 1:
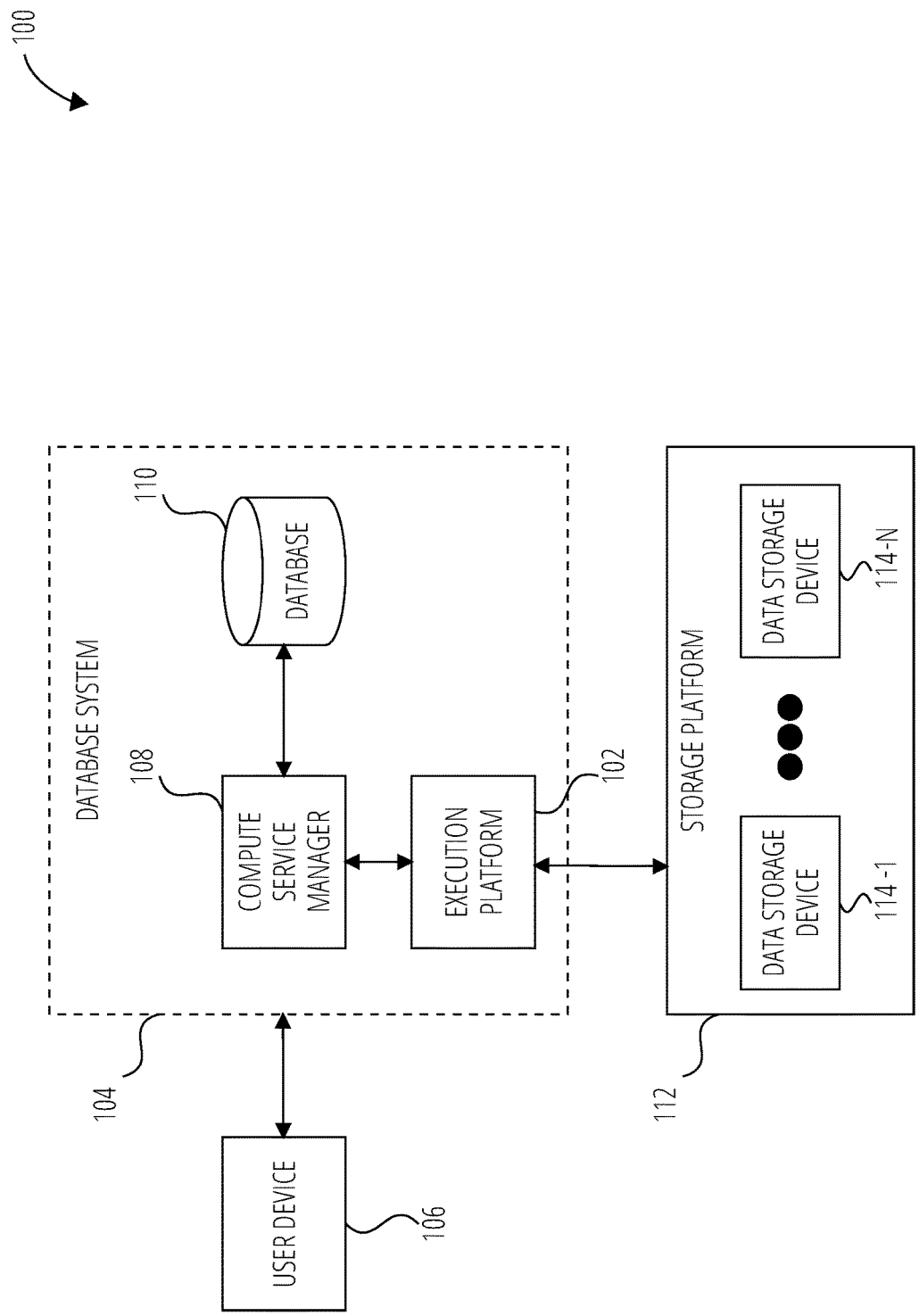
FIG. 1 illustrates an example computing environment that includes a network-based database system in communication with a cloud storage provider system, in accordance with some embodiments of the present disclosure.

In the present disclosure, physical units of data that are stored in a database platform— and that make up the content of, e.g., database tables in customer accounts—are referred to as micro-partitions. In various different implementations, a database platform may store metadata in micro-partitions as well. The term "micro-partitions" is distinguished in this disclosure from the term "files," which as used herein refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and/or the like. If stored internal to the database platform, a given file is referred to herein as an "internal file" and may be stored in a given micro-partition or across multiple micro-partitions in (or at, or on, etc.) what is referred to herein as an "internal storage location." If stored external to the database platform, a given file is referred to herein as an "external file" and is referred to as being stored in (or at, or on, etc.) what is referred to herein as an "external storage location." These terms are further discussed below.

Computer-readable files come in a number of varieties, including unstructured files, semi-structured files, and structured files. These terms may mean different things to different people. As used herein, examples of unstructured files include image files, video files, PDFs, and the like; examples of semi-structured files include JavaScript Object Notation (JSON) files, eXtensible Markup Language (XML) files, and the like; and examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data. Numerous other example unstructured-file types, semi-structured-file types, and structured-file types, as well as example uses thereof, could certainly be listed here as well and will be familiar to those of skill in the relevant arts.

As alluded to above, it is often the case that organizations that are customers of a given database platform also maintain data storage (e.g., a data lake) that is external to the database platform (i.e., one or more external storage locations). For example, a company could be a customer of a particular database platform and also separately maintain storage of any number of files—be they unstructured files, semi-structured files, and/or structured files—on, as examples, one or more of their own servers and/or on one or more cloud platforms such as Amazon Web Services (AWS), Microsoft Azure, Google Cloud Platform (GCP), and/or the like. The customer's own servers and cloud platforms are both examples of what a given customer could use as what is referred to herein as an external storage location. And as described below, a database platform could also use a cloud platform as what is referred to herein as an internal storage location with respect to the database platform.

From the perspective of an example database platform, one or more files that are stored at one or more storage locations are referred to herein as being organized into one or more of what are referred to herein as either "internal stages" or "external stages," where internal stages are stages that correspond to data storage at one or more internal storage locations, and where external stages are stages that correspond to data storage at one or more external storage locations. Thus, external files can be stored in external stages at external storage locations, and internal files can be stored in internal stages (in and/or across one or more micro-partitions) at one or more internal storage locations, which can include servers managed and controlled by the same organization (e.g., company) that manages and controls the database platform, and which can instead or in addition include data-storage resources operated by a storage provider (e.g., a cloud platform) that is used by the database platform for its "internal" storage. The internal storage of a database platform is also referred to herein as the "storage platform" of the database platform. It is further noted that a given external file that a given customer stores at a given external storage location may or may not be stored in an external stage in the external storage location—i.e., in some database-platform implementations, it is a customer's choice whether to create one or more external stages (e.g., one or more external-stage database objects) in the customer's database-platform account as an organizational and functional construct for conveniently interacting via the database platform with one or more external files.

Accordingly, a customer account on a database platform may include one or more account-level database objects corresponding respectively to one or more stages, one or more of which could be internal stages, and one or more of which could be external stages. One or more other types of stages could be implemented instead of and/or in addition to the internal stages and external stages that are described by way of example in the present disclosure. In a customer account that includes at least one internal stage and at least one external stage, each internal stage may have a stage name as a user-settable property of the internal stage, and the database platform may manage the actual storage location of that internal stage "behind the scenes," such that the customer generally is not and generally need not be explicitly aware of the actual precise storage location (e.g., the Uniform Resource Locator (URL)) of that internal stage. Each external stage may have not only a stage name (for the customer's convenience and for other reference), but each external stage may also have a user-settable property that explicitly points (in the form of, e.g., a URL) to the external storage location of the corresponding external stage. The stage-location property of a given stage is referred to herein at times as the "stage URL" of that stage; in the case of both internal and external stages, the stage-name property of a given stage is referred to herein as the "stage name" of that stage; both of these stage-property labels are presented here as examples and not by way of limitation.

In some current implementations of database platforms, a customer of a database platform may use an application (e.g., a custom application) to extract various metadata items from various external files that the customer keeps at an external storage location. The customer may store that extracted metadata in one or more tables in the customer's account on the database platform. In one such example, the customer may create a table in which each external file is represented by a row in the table and each metadata item that is extracted and stored in the table occupies a column in the table. In many instances, a customer may also include, in the table, a column in which the customer stores a URL corresponding to the location of the external file in the external storage location, so that the URL is associated in the table with the other metadata items that also correspond to the respective external file. In such a table, the URL is typically stored as a string (i.e., as an instance of an alphanumeric-character-string data type), and is generally not operative to simply be clicked on for downloading or opening the external file from the corresponding external storage location, since security credentials are typically required for such access.

In some instances, instead of or in addition to metadata, customers may use an application (e.g., a custom application) to extract one or more pieces of content (e.g., one or more fields, one or more particular bytes, etc.) from an external file and then store the one or more pieces of extracted content in a given column of the same or another table in their account on the database platform.

The database platform disclosed herein manages unstructured data stored in two types of stages: external stage and internal stage. A customer of the database platform manages the external stage. An internal user (e.g., not a customer) of the database platform manages the internal stage.

A directory table can be enabled on a stage. In one example, directory tables store a catalog of staged files in cloud storage. Roles with sufficient privileges can query a directory table to retrieve file URLs to access the staged files, as well as other metadata.

A directory table is not a separate database object; rather, it is an implicit object layered on a stage. Both external (external cloud storage) and internal stages support directory tables. A directory table has no grantable privileges of its own. A directory table can be added explicitly to a stage when the stage is created (using CREATE STAGE) or later (using ALTER STAGE).

Conceptually, directory tables are similar to external tables in that they store file-level metadata about the data files in a stage. Query a directory table to retrieve the Snowflake-hosted file URL to each file in the stage. A file URL permits prolonged access to a specified file. That is, the file URL does not expire. The same file URL is returned by calling the BUILD_STAGE_FILE_URLfunction.

If the customer of the database platform puts a file in the external stage, the directory table is automatically refreshed to register the new file. However, if the customer puts a file in an internal stage, the directory table may not be automatically refreshed. Typically, the customer manually requests a refresh commend to refresh the directory tables on the stages.

To address these and other shortcomings of prior implementations, disclosed herein are various embodiments of systems and methods for automatically refreshing internal stages. The customer simply puts a file in an internal stage and the file automatically shows up in the directory table. In contrast to the conventional state of the art, the customer does not need to run any further commands to register the file with directory table. The various embodiments that are described herein are described with reference where appropriate to one or more of the various figures.

In one example embodiment, the database platform enables auto refresh on internal stages for third party storage service (e.g., AWS) deployments. For example, the database platform uses an "auto-ingest framework" to build auto-refresh of directory tables for internal stages. In one example embodiment, Snowflake (CloudEng) creates a Simple Queue Service (SQS) queue for each DS AWS account to receive stage bucket PUT/DELETE event notifications. Background GS cluster polls the S3 stage bucket PUT/DELETE event notification SQS [one per each DS AWS account] and routes the S3 event notification message to the corresponding distributed database (e.g., Foundation DB (FDB)) Async task queue partition for that customer (if it exists) or dropping them (results). Ingest processes the FDB Async task queue(s) as a new ingest notification channel and directs the S3 notification events to the corresponding pipes' processor. Once an S3 event is matched to a pipe, the rest of the processing uses the existing Ingest tech.

Per-Customer queue partition helps prevent a single customer from spamming the ingest processing. Customer partitioned queue for internal stages is different from the per-customer SQS created for external stages/snow-pipes. Per-customer queue ingest processing is shard-ed across GS Ingest cluster nodes using consistent hashing.

One or more embodiments of the present disclosure take the form of methods that include multiple operations. One or more other embodiments take the form of systems (e.g., database platforms) that include at least one processor and that also include one or more computer-storage media containing instructions executable by the at least one processor for causing the at least one processor to perform multiple operations (that may or may not correspond to operations performed in a herein-disclosed method embodiment). Still one or more other embodiments take the form of one or more computer-storage media containing instructions executable by at least one processor (of, e.g., a database platform) for causing the at least one processor to perform multiple operations (that, again, may or may not correspond to operations performed in a herein-disclosed method embodiment and/or operations performed by a herein-disclosed system embodiment).

Furthermore, a number of variations and permutations of embodiments are described herein, and it is expressly noted that any variation or permutation that is described in this disclosure can be implemented with respect to any type of embodiment. For example, a variation or permutation that is primarily described in this disclosure in connection with a method embodiment could just as well be implemented in connection with a system embodiment (e.g., a database-platform embodiment), a computer-storage-medium (or computer-storage-media) embodiment, and/or one or more other types of embodiments. Furthermore, this flexibility and cross-applicability of embodiments is present in spite of the use herein of any slightly different language (e.g., processes, methods, methodologies, steps, operations, functions, and/or the like) to describe and/or characterize such embodiments and/or any element or elements thereof.

FIG. 1 illustrates an example computing environment 100 that includes a database system 104 in communication with a storage platform 112, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the computing environment 100 comprises the database system 104 and a storage platform 112 (e.g., AWS®, Microsoft Azure Blob Storage®, or Google Cloud Storage®). The database system 104 is used for reporting and analysis of integrated data from one or more disparate sources including data storage device 114-1 to data storage device 114-N within the storage platform 112. The storage platform 112 comprises a plurality of computing machines and provides on-demand computer system resources such as data storage and computing power to the database system 104.

The database system 104 comprises a compute service manager 108, an execution platform 102, and a database 110. The database system 104 hosts and provides data reporting and analysis services to multiple client accounts. Administrative users can create and manage identities (e.g., users, roles, and groups) and use permissions to allow or deny access to the identities to resources and services.

The compute service manager 108 coordinates and manages operations of the database system 104. The compute service manager 108 also performs query optimization and compilation as well as managing clusters of compute services that provide compute resources (also referred to as "virtual warehouses"). The compute service manager 108 can support any number of client accounts such as end users providing data storage and retrieval requests, system administrators managing the systems and methods described herein, and other components/devices that interact with the compute service manager 108.

The compute service manager 108 is also in communication with a user device 106. The user device 106 corresponds to a user of one of the multiple client accounts supported by the database system 104. In some embodiments, the compute service manager 108 does not receive any direct communications from the user device 106 and only receives communications concerning jobs from a queue within the database system 104.

The compute service manager 108 is also coupled to database 110, which is associated with the data stored in the computing environment 100. The database 110 stores data pertaining to various functions and aspects associated with the database system 104 and its users. In some embodiments, the database 110 includes a summary of data stored in remote data storage systems as well as data available from a local cache. Additionally, the database 110 may include information regarding how data is organized in remote data storage systems (e.g., storage platform 112) and the local caches. The database 110 allows systems and services to determine whether a piece of data needs to be accessed without loading or accessing the actual data from a storage device.

In some embodiments, the compute service manager 108 may determine that a job should be performed based on data from the database 110. In such embodiments, the compute service manager 108 may scan the data and determine that a job should be performed to improve data organization or database performance.

The compute service manager 108 is further coupled to the execution platform 102, which provides multiple computing resources that execute various data storage and data retrieval tasks. The execution platform 102 is coupled to the storage platform 112. The storage platform 112 comprises multiple data storage devices 114-1 to 114-N. In some embodiments, the data storage devices 114-1 to 114-N are cloud-based storage devices located in one or more geographic locations. For example, the data storage devices 114-1 to 114-N may be part of a public cloud infrastructure or a private cloud infrastructure. The data storage devices 114-1 to 114-N may be hard disk drives (HDDs), solid state drives (SSDs), storage clusters, Amazon S3TM storage systems or any other data storage technology. Additionally, the storage platform 112 may include distributed file systems (e.g., Hadoop Distributed File Systems (HDFS)), object storage systems, and the like.

The execution platform 102 comprises a plurality of compute nodes. A set of processes on a compute node executes a query plan compiled by the compute service manager 108. The set of processes can include: a first process to execute the query plan; a second process to monitor and delete micro-partition files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 102.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, the data storage devices 114-1 to 114-N are decoupled from the computing resources associated with the execution platform 102. This architecture supports dynamic changes to the database system 104 based on the changing data storage/retrieval needs as well as the changing needs of the users and systems. The support of dynamic changes allows the database system 104 to scale quickly in response to changing demands on the systems and components within the database system 104. The decoupling of the computing resources from the data storage devices 114-1 to 114-N supports the storage of large amounts of data without requiring a corresponding large amount of computing resources. Similarly, this decoupling of resources supports a significant increase in the computing resources utilized at a particular time without requiring a corresponding increase in the available data storage resources.

The compute service manager 108, the database 110, the execution platform 102, and the storage platform 112 are shown in FIG. 1 as individual discrete components. However, each of the compute service manager 108, the database 110, the execution platform 102, and the storage platform 112 may be implemented as a distributed system (e.g., distributed across multiple systems/platforms at multiple geographic locations). Additionally, each of the compute service manager 108, the database 110, the execution platform 102, and the storage platform 112 can be scaled up or down (independently of one another) depending on changes to the requests received and the changing needs of the database system 104. Thus, in the described embodiments, the database system 104 is dynamic and supports regular changes to meet the current data processing needs.

During typical operation, the database system 104 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 102 to process the task. The compute service manager 108 may determine what data is needed to process a task and further determine which nodes within the execution platform 102 are best suited to process the task. Some nodes may have already cached the data needed to process the task and, therefore, be a good candidate for processing the task.

Metadata stored in the database 110 assists the compute service manager 108 in optimizing user queries by determining which nodes in the execution platform 102 have already cached at least a portion of the data needed to process the task. In some embodiments, metadata includes a summary of data stored in remote data storage systems as well as data available from a local cache (e.g., a cache within one or more of the clusters of the execution platform 102). Additionally, metadata may include information regarding how data is organized in the remote data storage systems and the local caches. Metadata allows systems and services to determine whether a piece of data needs to be processed without loading or accessing the actual data from a storage device.

One or more nodes in the execution platform 102 process the task using data cached by the nodes and, if necessary, data retrieved from the storage platform 112. It is desirable to retrieve as much data as possible from caches within the execution platform 102 because the retrieval speed is typically much faster than retrieving data from the storage platform 112.

As shown in FIG. 1, the computing environment 100 separates the execution platform 102 from the storage platform 112. In this arrangement, the processing resources and cache resources in the execution platform 102 operate independently of the data storage devices 114-1 to 114-N in the storage platform 112. Thus, the computing resources and cache resources are not restricted to specific data storage devices 114-1 to 114-N. Instead, all computing resources and all cache resources may retrieve data from, and store data to, any of the data storage resources in the storage platform 112.

Figure 2:
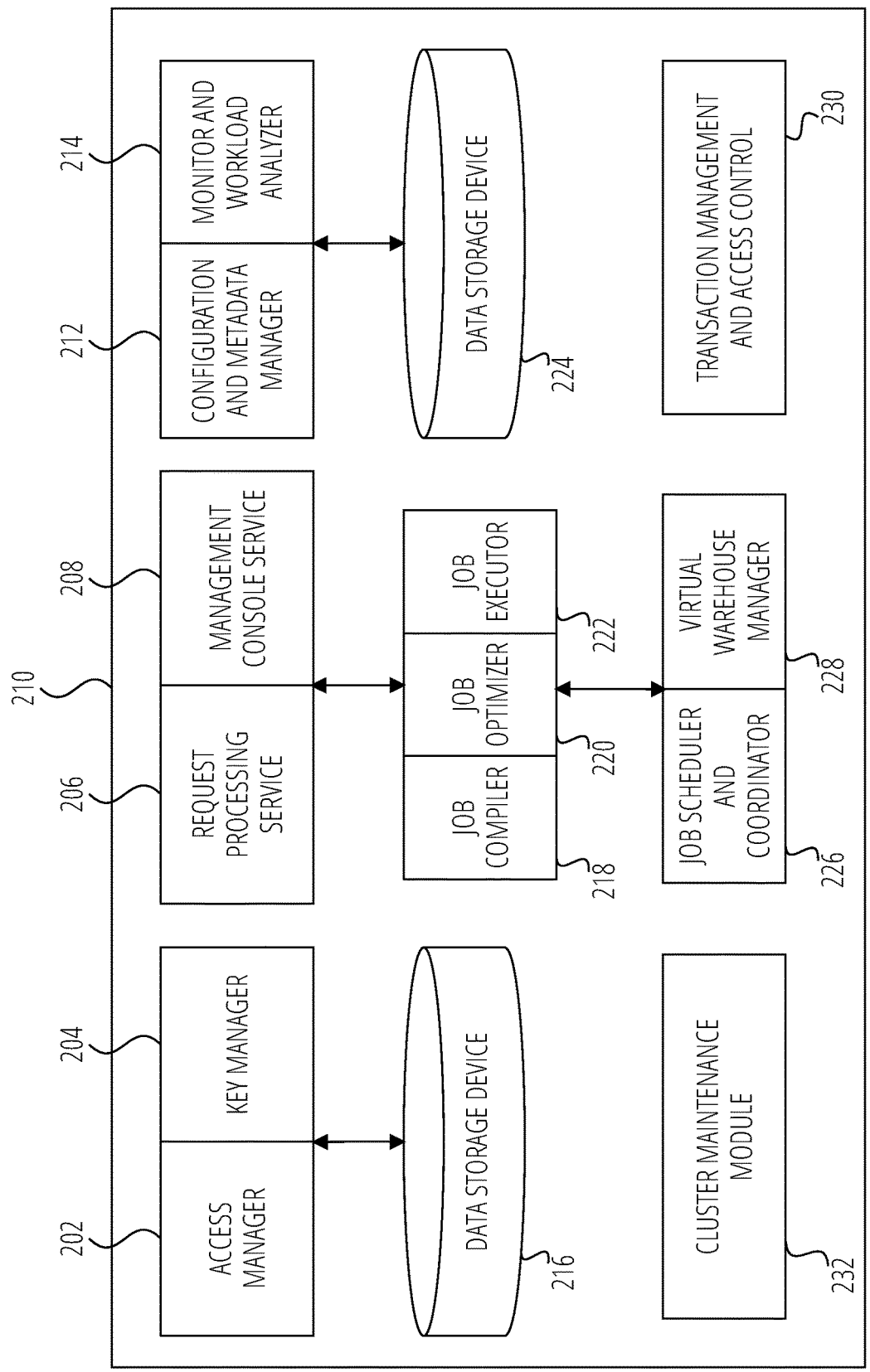
FIG. 2 is a block diagram illustrating components of a compute service manager, in accordance with some embodiments of the present disclosure.

FIG. 2 is a block diagram illustrating components of the compute service manager 210, in accordance with some embodiments of the present disclosure. As shown in FIG. 2, the compute service manager 210 includes an access manager 202, a key manager 204, a request processing service 206, a management console service 208, a configuration and metadata manager 212, a monitor and workload analyzer 214, a data storage device 216, a job compiler 218, a job optimizer 220, a job executor 222, a data storage device 224, a job scheduler and coordinator 226, a virtual warehouse manager 228, a transaction management and access control 230, and a cluster maintenance module 232.

The access manager 202 and the key manager 204 coupled to the data storage device 216. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., 114-1 to 114-N in storage platform 112). As used herein, the remote storage devices may also be referred to as "persistent storage devices" or "shared storage devices."

The request processing service 206 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 102 or in a data storage device in storage platform 112.

The management console service 208 supports access to various systems and processes by administrators and other system managers. Additionally, the configuration and metadata manager 212 may receive a request to execute a job and monitor the workload on the system.

The job compiler 218 parses a job into multiple discrete tasks and generates the execution code for each of the multiple discrete tasks. The job optimizer 220 determines the best method to execute the multiple discrete tasks based on the data that needs to be processed. The job optimizer 220 also handles various data pruning operations and other data optimization techniques to improve the speed and efficiency of executing the job. The job executor 222 executes the execution code for jobs received from a queue or determined by the compute service manager 210.

The job scheduler and coordinator 226 sends received jobs to the appropriate services or systems for compilation, optimization, and dispatch to the execution platform 102. For example, jobs may be prioritized and processed in that prioritized order. In an embodiment, the job scheduler and coordinator 226 determines a priority for internal jobs that are scheduled by the compute service manager 210 with other "outside" jobs such as user queries that may be scheduled by other systems in the database but may utilize the same processing resources in the execution platform 102. In some embodiments, the job scheduler and coordinator 226 identifies or assigns particular nodes in the execution platform 102 to process particular tasks.

The virtual warehouse manager 228 manages the operation of multiple virtual warehouses implemented in the execution platform 102. As discussed below, each virtual warehouse includes multiple execution nodes that each include a cache and a processor.

The configuration and metadata manager 212 manages the information related to the data stored in the remote data storage devices and in the local caches (e.g., the caches in execution platform 102). In one example, the configuration and metadata manager 212 uses the metadata to determine which data micro-partitions need to be accessed to retrieve data for processing a particular task or job.

The monitor and workload analyzer 214 oversees processes performed by the compute service manager 210 and manages the distribution of tasks (e.g., workload) across the virtual warehouses and execution nodes in the execution platform 102. The monitor and workload analyzer 214 also redistributes tasks, as needed, based on changing workloads throughout the database system 104 and may further redistribute tasks based on a user (e.g., "external") query workload that may also be processed by the execution platform 102. The configuration and metadata manager 212 and monitor and workload analyzer 214 are coupled to the data storage device 224. The data storage device 224 and the data storage device 216 represent any data storage device within the database system 104. For example, data storage device 224 and the data storage device 216 may represent caches in execution platform 102, storage devices in storage platform 112, or any other storage device.

The transaction management and access control 230 manages the various tasks and other activities associated with the processing of data storage requests and data access requests. For example, the transaction management and access control 230 provides consistent and synchronized access to data by multiple users or systems. Since multiple users/systems may access the same data simultaneously, changes to the data may be synchronized to ensure that each user/system is working with the current version of the data. The transaction management and access control 230 provides control of various data processing activities at a single, centralized location in compute service manager 210.

The cluster maintenance module 232 manages the clustering and ordering of partitions of a table. The cluster maintenance module 232 may partition each table in a database into one or more partitions or micro-partitions. The cluster maintenance module 232 may not require or achieve ideal clustering for the table data but may maintain "good enough" or approximate clustering. For example, ideal clustering on a specific attribute may result in each partition either having non-overlapping value ranges or having only a single value for the specific attribute. Because the cluster maintenance module 232 does not require perfect clustering, significant processing and memory resources may be conserved during data loading or DML command operations.

At least some embodiments may manage the ordering or clustering of a table using micro-partitions. As mentioned previously, traditional data warehouses rely on static partitioning of large tables to achieve acceptable performance and enable better scaling. In these systems, a partition is a unit of management that is manipulated independently using specialized data definition language (DDL) and syntax. However, static partitioning has a number of well-known limitations, such as maintenance overhead and data skew, which can result in disproportionately-sized partitions. Embodiments disclosed herein may implement a powerful and unique form of partitioning, called micro-partitioning, that delivers all the advantages of static partitioning without the known limitations, as well as providing additional significant benefits.

In one embodiment, all data in tables is automatically divided into micro-partitions, which are contiguous units of storage. By way of example, each micro-partition may contain between 50 MB and 500 MB of uncompressed data (note that the actual size in storage may be smaller because data may be stored compressed). Groups of rows in tables are mapped into individual micro-partitions, organized in a columnar fashion. This size and structure allows for extremely granular pruning of very large tables, which can be comprised of millions, or even hundreds of millions, of micro-partitions. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded.

Figure 3:
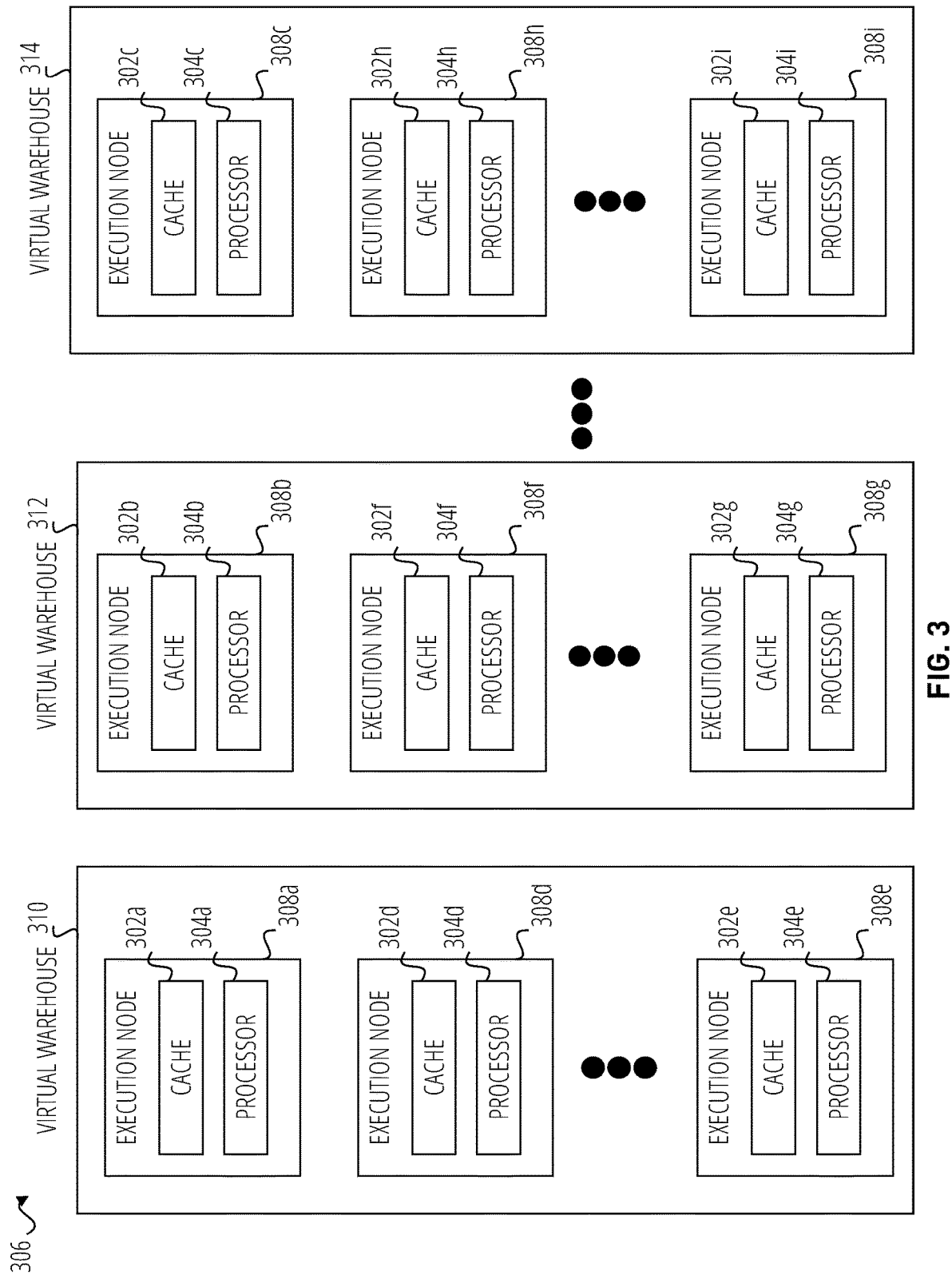
FIG. 3 is a block diagram illustrating components of an execution platform, in accordance with some embodiments of the present disclosure.

FIG. 3 is a block diagram illustrating components of the execution platform 306, in accordance with some embodiments of the present disclosure. As shown in FIG. 3, the execution platform 306 includes multiple virtual warehouses, including virtual warehouse 310, virtual warehouse 312, virtual warehouse 314. Each virtual warehouse includes multiple execution nodes that each includes a data cache and a processor. The virtual warehouses can execute multiple tasks in parallel by using the multiple execution nodes. As discussed herein, the execution platform 306 can add new virtual warehouses and drop existing virtual warehouses in real-time based on the current processing needs of the systems and users. This flexibility allows the execution platform 306 to quickly deploy large amounts of computing resources when needed without being forced to continue paying for those computing resources when they are no longer needed. All virtual warehouses can access data from any data storage device (e.g., any storage device in storage platform 112).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage device 114-1 to 114-N shown in FIG. 1. Thus, the virtual warehouses are not necessarily assigned to a specific data storage device 114-1 to 114-N and, instead, can access data from any of the data storage device 114-1 to 114-N within the storage platform database system 104. Similarly, each of the execution nodes shown in FIG. 3 can access data from any of the data storage device 114-1 to 114-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 310 includes three execution nodes (execution node 308a, 308d, 308e). The execution node 308a includes a cache 302a and a processor 304a. Execution node 308d includes a cache 302d and a processor 304d. Execution node 308e includes a cache 302e and a processor 304e.

Each execution node 308a, 308d, 308e is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 310 discussed above, virtual warehouse 312 includes three execution nodes (execution node 308b, 308f, 308g). Execution node 308b includes a cache 302b and a processor 304b. Execution node 308f includes a cache 302f and a processor 304f. Execution node 308g includes a cache 302g and a processor 304g.

Similar to virtual warehouse 310 and virtual warehouse 312 discussed above, virtual warehouse 314 includes three execution nodes (execution node 308c, 308h, 308i). Execution node 308c includes a cache 302c and a processor 304c. Execution node 308f includes a cache 302f and a processor 304f. Execution node 308g includes a cache 302g and a processor 304g.

In some embodiments, the execution nodes shown in FIG. 3 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in storage platform 112. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the storage platform 112.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouse 310, 312, and 314 are associated with the same execution platform 306, the virtual warehouses may be implemented using multiple computing systems at multiple geographic locations. For example, virtual warehouse 310 can be implemented by a computing system at a first geographic location, while virtual warehouse 312 and virtual warehouse 314 are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 310 implements execution node 308a and 308d on one computing platform at a geographic location and implements execution node 308e at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 306 is also fault tolerant. For example, if one virtual warehouse fails, that virtual warehouse is quickly replaced with a different virtual warehouse at a different geographic location.

A particular execution platform 306 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in storage platform 112, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
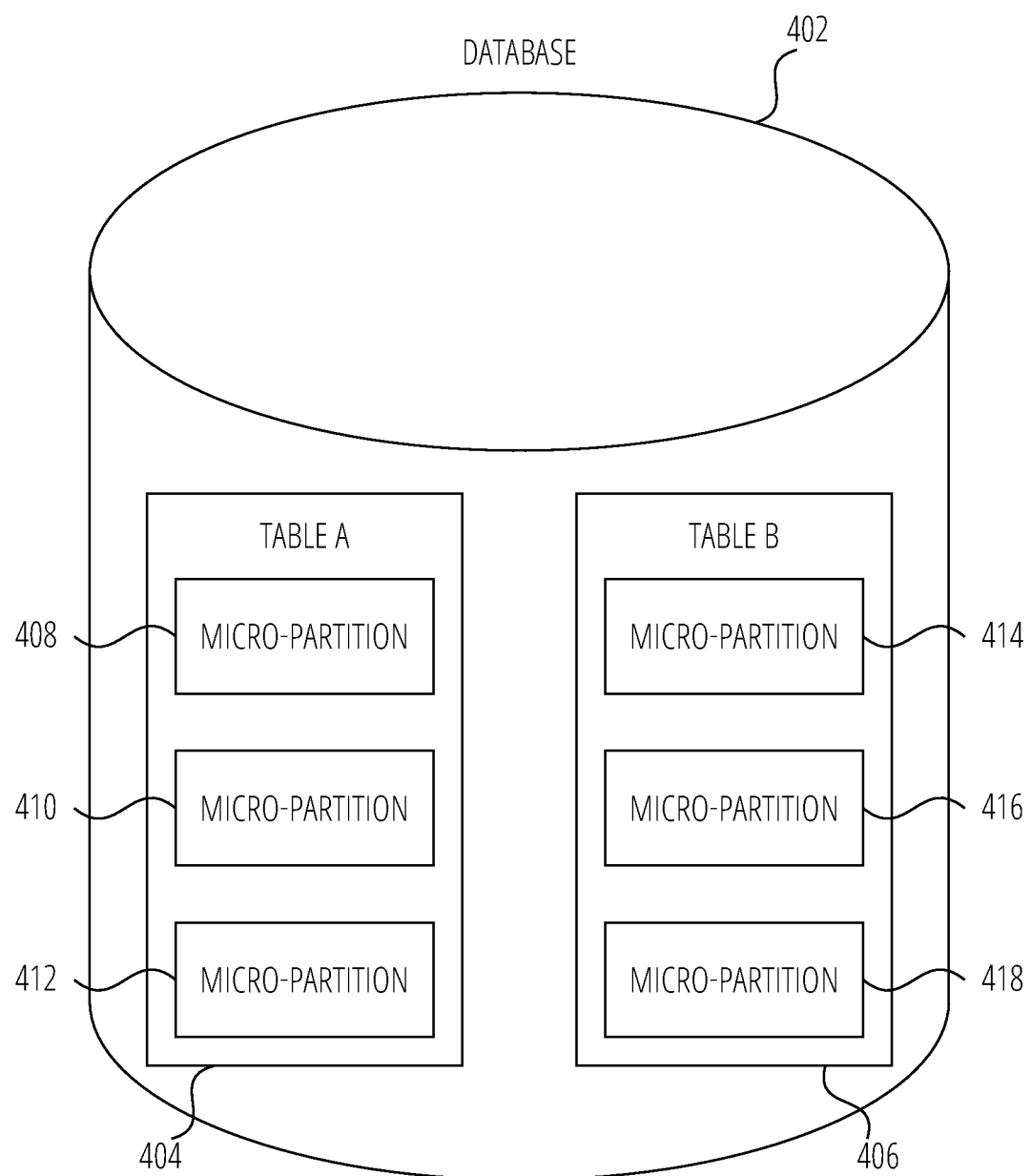
FIG. 4 is a block diagram illustrating storage of database tables in micro-partitions, according to some example embodiments.

FIG. 4 is a block diagram of a database 402 illustrating storage of database tables in micro-partitions, according to some example embodiments. The database 402 includes table A 404 and table B 406. The table A 404 is stored in micro-partitions 408, 410, and 412. The table B 406 is stored in micro-partitions 414, 416, and 418. Each micro-partition may be implemented as a file in a file system.

Each of the micro-partitions 408-418 may be compressed or uncompressed. Furthermore, each of the compressed micro-partitions may be compressed using a different compression algorithm. Thus, the micro-partition 408 may have a first column stored using dictionary compression, the micro-partition 410 may be stored uncompressed, and the micro-partition 412 may store a second column using dictionary compression. Similarly, the micro-partition 414 may have a first column stored using dictionary compression, the micro-partition 416 may have the first column and a second column stored using dictionary compression, and the micro-partition 418 may be stored using run-length encoding for the same or different columns.

Database-Platform Architecture and Environment

Figure 5:
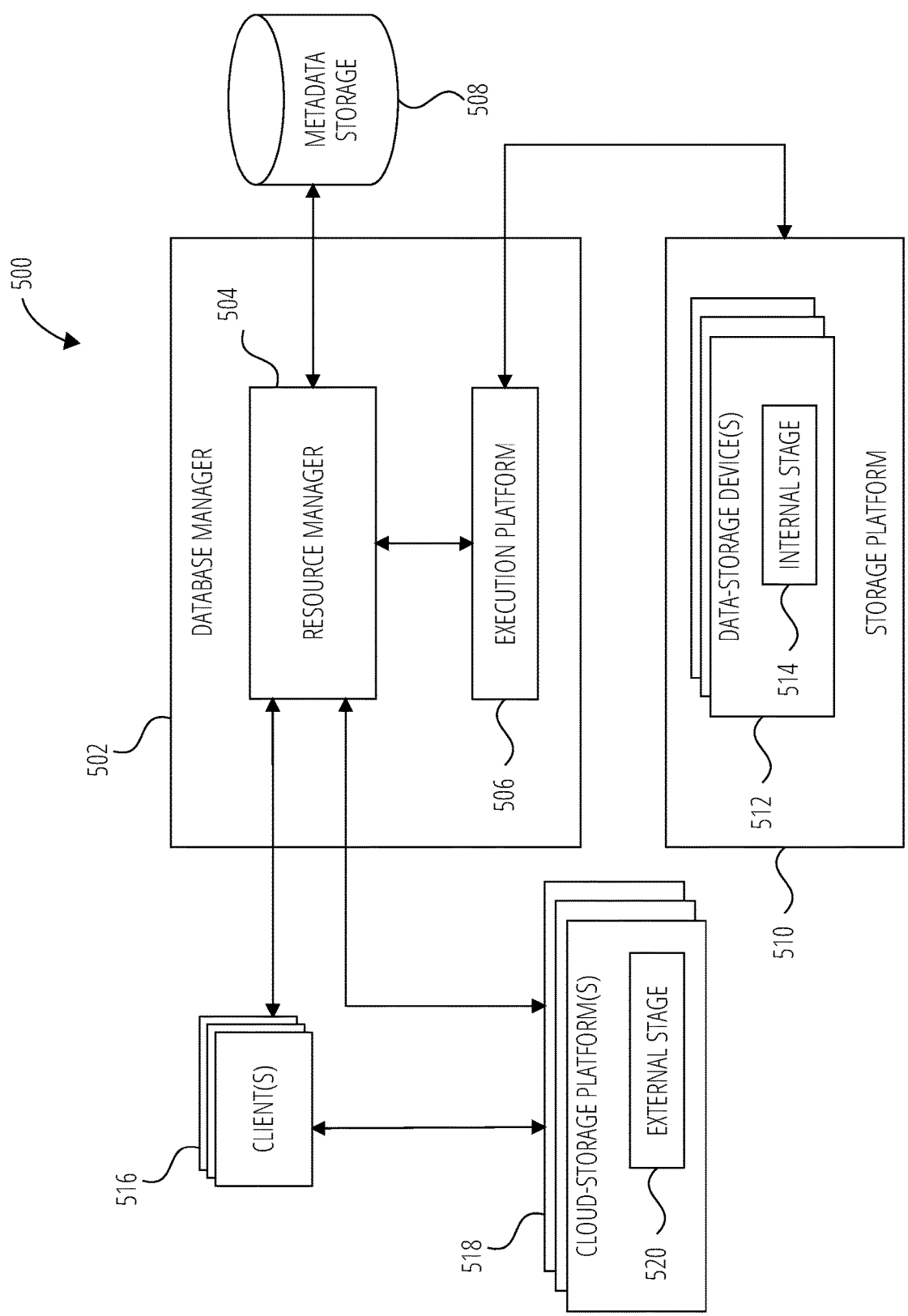
FIG. 5 illustrates an example database platform, in accordance with at least one embodiment.

FIG. 5 illustrates an example database platform 500, in accordance with at least one embodiment. In various embodiments, the database platform 500 may be used for performing one or more of the operations (e.g., one or more of the methods) that are disclosed herein. As shown in FIG. 5, the database platform 500 includes a database manager 502, which includes a resource manager 504 and an execution platform 506. The database manager 502 need not be a defined physical device, though it could be, but in general is used herein as shorthand to refer to the combination of the resource manager 504 and the execution platform 506. The execution platform 506 may include one or more execution nodes (e.g., servers, workers, threads, and/or the like). A grouping of execution nodes in the execution platform 506 may be referred to as a virtual warehouse, and such virtual warehouses are, in some embodiments, dynamically scalable to meet dynamically changing demands. Also depicted in FIG. 5 are a metadata storage 508, a storage platform 510 that includes one or more data-storage devices 512—an example one of which includes an example internal stage 514, one or more clients 516, and one or more cloud-storage platforms 518—an example one of which includes an example external stage 520. In various different implementations, there could be any number of any of the entities that are shown in FIG. 5, including any number of internal stages 514 and any number of external stages 520. Moreover, different internal stages 514 could reside in different data-storage devices 512, and different external stages 520 could reside in different cloud-storage platforms 518.

In some embodiments, all of the entities—other than the one or more cloud-storage platforms 518—that are depicted in FIG. 5 are part of what is referred to herein as the database platform 500, though this is not the case in other embodiments. For example, in at least one embodiment, the database platform 500 does not include any of the one or more clients 516. As another example, in some embodiments, the database platform 500 does not include the storage platform 510. In the embodiments that are primarily described herein to illustrate various examples, the database platform 500 includes the database manager 502 (including the resource manager 504 and the execution platform 506), the metadata storage 508, and the storage platform 510, and does not include any of the one or more clients 516 or any of the one or more cloud-storage platforms 518 (and therefore does not (physically) include any external stages 520). As described below and as mentioned above, the storage platform 510 could be implemented in whole or in part on a cloud platform and still be considered part of the database platform 500.

The resource manager 504 may be configured to manage a number of different types of tasks including external database tasks (e.g., query requests) that are received from, e.g., a client 516. The resource manager 504 may be coupled to any number of clients 516. A client 516 may facilitate end users making data-storage and/or data-retrieval requests, system administrators managing the database platform 500, and/or the like. In various different embodiments, a client 516 could be a web interface, a JDBC driver, an ODBC driver, a desktop application, a mobile app, and/or another type of client. As shown in FIG. 5, a client 516 may communicate with the storage platform 510 (e.g., the resource manager 504 of the database manager 502) and one or more cloud-storage platforms 518. A client 516 could reside on a client-side computing device on which the client 516 interacts with one or more client-side applications and on which the client 516 makes use of certain client-side-system resources such as network interfaces, user interfaces, memory (e.g., random access memory (RAM)), and/or the like.

As depicted in FIG. 5, the resource manager 504 is communicatively coupled to the metadata storage 508, which in at least one embodiment is associated with data stored throughout the database platform 500, and may also reflect data stored on one or more external stages 520. Indeed, in some embodiments, the metadata storage 508 includes one or more summaries of data available in one or more local caches (of, e.g., the resource manager 504 and/or the execution platform 506), data stored in the storage platform 510, and/or data stored in one or more external stages 520. Additionally, the metadata storage 508 may include information regarding how data is organized in one or more local caches, one or more storage platforms 510, one or more external stages 520, and/or the like.

Among other uses, the metadata storage 508 may allow systems and services of the database platform 500 to determine whether a given quantum of data needs to be processed (in connection with, e.g., a given query) without loading or accessing the actual stored data. In various embodiments, metadata may reflect the contents of one or more databases, one or more tables, one or more columns, one or more materialized views, and/or one or more other collections of records, parts of records, and/or other data quanta. With respect to where the metadata storage 508 is actually stored, a separate (e.g., local) storage location (e.g., a key-value store) is used in some embodiments, while in other embodiments the metadata storage 508 is maintained by the database platform 500 as a subset of the data stored in the storage platform 510. Other architectures are possible as well.

The resource manager 504 is also communicatively coupled to the execution platform 506, which may provide multiple computing resources that execute various tasks involving data storage, data retrieval, data analysis (e.g., query processing), and/or the like. In at least one embodiment, the resource manager 504 includes a layer of code (e.g., Java code) that is global with respect to the database platform 500, where that code layer includes instructions for performing functions such as compiling queries and brokering requests to one or more execution nodes in the execution platform 506. In some embodiments, there exists one or more instances of the execution platform 506 used for executing (i) client tasks, such as database queries and/or (ii) internal database tasks such as updating metadata, clustering tables, generating materialized views, and/or the like. In some such embodiments, there also exists one or more instances of the execution platform 506 used for feature development and/or testing of the database platform 500, and each such instance of the execution platform 506 may be separate from each client-task instance of the execution platform 506, such that, for example, client-task processing is not impacted by feature-development tasks, database-platform-administration tasks, and/or the like. Other arrangements are possible as well.

The execution platform 506 may be coupled to the one or more data-storage devices 512 that are part of the storage platform 510, which may include (and an execution platform 506 may be capable of communicating with) any number of data-storage devices 512. In some embodiments, one or more of the data-storage devices 512 are cloud-based storage devices located in one or more geographic locations. For example, one or more of the data-storage devices 512 may be part of a public cloud infrastructure or a private cloud infrastructure. One or more of the data-storage devices 512 may be or include hard disk drives (HDDs), solid state drives (SSDs), storage clusters, and/or any other data-storage technology. In some examples, the storage platform 510 includes distributed file systems (such as Hadoop Distributed File Systems (HDFSs)), object storage systems, and/or the like. As mentioned above and as described more fully below, the one or more data-storage devices 512 of the storage platform 510 may contain one or more internal stages 514.

As shown in FIG. 5, the storage platform 510, including the one or more data-storage devices 512, is decoupled from the computing resources associated with the execution platform 506, the resource manager 504, and the database manager 502 generally. In an embodiment, each of a plurality of database-platform deployments includes a respective storage platform 510 having its own respective one or more data-storage devices. That type of architecture supports dynamic changes to the database platform 500 based on changing data-storage and/or data-retrieval needs, as well as changing needs of users and systems accessing the database platform 500. The support of dynamic changes allows the database platform 500 to scale quickly in response to changing demands on the systems and components within the database platform 500. The decoupling of the computing resources from the data-storage devices supports the storage of large amounts of data without requiring a corresponding large amount of computing resources. Similarly, this decoupling supports a significant increase in the computing resources utilized at a particular time without requiring a corresponding increase in data-storage resources.

As a general matter, in at least some embodiments, the database platform 500 can be referred to using terms such as a cloud-based data warehouse, a network-based data warehouse, or simply a data warehouse. A cloud-based data warehouse is one type of network-based data system that can be used for data analysis and reporting and that includes a central repository of integrated data from one or more disparate sources. A cloud-based data warehouse is commonly an OLAP database that can store current and historical data that can be used for creating analytical reports for an enterprise based on data stored within databases maintained on behalf of the enterprise. To this end, data warehouses often provide business-intelligence tools, tools to perform extract-transform-load (ETL) tasks for ingesting data into the repository, tools to manage and retrieve metadata, and/or the like. There are other types of cloud-based data warehouses, such as OLTP databases, as well as data warehouses and other data systems that operate with characteristics of multiple types of database systems.

Any one or more of the components, devices, systems, and/or the like that are depicted in FIG. 5 and in any of the other figures could be implemented as one or more computing devices having an architecture that is similar to the example computing device 1100 (deleted) that is described below in connection with FIG. 11 (deleted). Moreover, two or more of the entities that are depicted in any of the figures could be combined into a single component, and any entity that is depicted as a single component in any of the figures could instead be distributed across multiple components (e.g., distributed across multiple systems, platforms, and/or the like at multiple geographic locations). Moreover, in particular embodiments, any one or more of the communication links depicted in FIG. 5 and in any of the other figures could be implemented via one or more data-communication networks, which may utilize any communication protocol and any type of communication medium. In some embodiments, the data-communication networks are a combination of two or more data-communication networks (or sub-networks) coupled to one another. In various different embodiments, these communication links are implemented using one or more of any types of communication medium and one or more of any types of communication protocol.

Stage Creation and Encryption

In some embodiments, a given database-platform customer is, as described above, able to use a client 516 to create one or more internal stages 514 and/or one or more external stages 520. The customer may provide the database platform 500 with login credentials (e.g., username and password) for each external stage 520 that is represented by a corresponding external-stage database object in the customer's account on the database platform 500, so that the database platform 500 can conveniently interact with the corresponding external stage 520 and/or the one or more external files stored therein.

With respect to internal stages 514, in at least one embodiment, the database platform 500 provides an option to a user that is creating an internal stage 514 to set an encryption property of the internal stage 514 to be either what is referred to herein as "full encryption" or what is referred to herein as "server-side-only encryption." In at least one embodiment, internal stages 514 that have their encryption property set to full encryption are both server-side-encrypted and client-side-encrypted, whereas internal stages 514 that have their encryption property set to server-side-only encryption are server-side-encrypted but are not client-side-encrypted. Furthermore, in at least one embodiment, external stages 520 that are created without either full encryption or server-side-only encryption being specified are by default set to use full encryption. And though the option is not discussed at length herein, an implementation using client-side-only encryption could be used as well.

As used herein, in at least one embodiment, an internal stage 514 being "server-side-encrypted" means that the data (including, e.g., one or more internal files) in the internal stage 514 is encrypted "at rest" in the storage platform 510 by the database platform 500 or by a storage provider (e.g., a cloud platform) that is used by the database platform 500 for implementing its storage platform 510. In a typical implementation in which the database platform 500 uses a storage provider for the storage platform 510, the storage provider may use their own encryption/decryption keys to decrypt internal files prior to transmitting the internal files to the database platform 500 (in the case of, e.g., a customer requesting a download of one or more of their internal files from the database platform 500 to, e.g., the customer's own server or other computer), where such transmission from the storage provider to the database platform 500 could be safeguarded through the use of HyperText Transfer Protocol Secure (HTTPS) communication that itself makes use of the Transport Layer Security (TLS) protocol, which is an updated version of the Secure Sockets Layer (SSL) protocol.

Furthermore, as used herein, in at least one embodiment, an internal stage 514 being "client-side-encrypted" means that, when a customer requests a download of one or more of their internal files from the internal stage 514, and after the database platform 500 requests and receives copies of the one or more internal files from the storage provider, the database platform 500 encrypts the one or more internal files with one or more encryption/decryption keys that are managed by the database platform 500, and then transmits the client-side-encrypted internal files to the customer (e.g., to the particular client 516 used by the customer to request the download). That transmission could also be an HTTPS/TLS transmission.

After receiving their one or more downloaded files from their internal stage 514, the associated customer needs a copy of the one or more encryption/decryption keys from the database platform 500 to be able to successfully open and substantively use the one or more downloaded internal files. If, however, an internal stage 514 is not client-side-encrypted, the database platform 500 may provide for the download (via, e.g., an HTTPS/TLS transmission) by the customer's client 516 of (otherwise) unencrypted internal files—i.e., the database platform 500 would not explicitly use any encryption/decryption keys to encrypt the one or more internal files prior to transmitting them to the customer's client 516, and the customer would not need any encryption/decryption keys from the database platform 500 in order to successfully open and substantively use the one or more internal files.

Defined Functions

In at least one embodiment of the present disclosure, the database platform 500 provides one or more functions for use by, e.g., customers, internal developers, external developers, etc. of the database platform 500. Some such functions are described by way of example below. In this disclosure, functions are referenced using a "function_name( )" notation, where "function_name" is the name of a given function, and where the empty parentheses (i.e., the "( )") at the end of the function name identify it as being a function (as opposed to, e.g., a stage, a data value, etc.). It is further noted that the "( )" at the end of a given function name in no way implies that the function takes zero arguments: it could, but it could just as well take one or more arguments as described by way of example herein. As some options, in at least one embodiment, any one or more of these functions can be called within a Java function, a JavaScript stored procedure, and/or the like.

Function: get_relative_path( )

One function that is provided by the database platform 500 in at least one embodiment is referred to herein as get_relative_path( ) In at least one embodiment, the function get_relative_path( ) enables users (e.g., customers, internal developers, external developers, other coders, and/or the like) to obtain what is referred to herein as the "relative path" of a given file that is stored on a given internal stage 514 or external stage 520. As used herein, the relative path of a file that is stored on a stage is a terminal portion of the network location (i.e., the "absolute path," e.g., the URL) of the file on the stage. The absolute path of a given file, the stage URL of the stage on which the file resides, and the relative path of the given file in that stage fit together in at least one embodiment as follows:

absolute_path=[stage_URL][relative_path]

(where the square brackets are shown to illustratively delineate the stage URL from the relative path and are not shown to indicate that they are actually textually present). Thus, in at least one embodiment, the absolute path (represented at times herein as "absolute_path") of a given file is a concatenation of the stage URL for that file and the relative path for that file, in that left-to-right order. Furthermore, by convention, in this disclosure, each stage URL (represented at times herein as "stage_URL") does not end in a forward slash ("/"), and each relative path (represented at times herein as "relative_path") starts with one. The opposite convention would work just as well.

In at least one embodiment, the function get_relative_path( ) takes two arguments: (1) the name of an internal stage 514 or an external stage 520 (the stage name being represented at times herein as "stage_name") and (2) the absolute path of a file that is stored on that internal stage 514 or external stage 520. A call of the function get_relative_path( ) may take the form of:

select get_relative_path
  (
  stage_name,
  'absolute_path'
  );

In at least one embodiment, the function get_relative_path( ) returns the relative path of the file on the stage as a string.

In an example scenario, a customer may create an internal stage 514 using the following example commands:

create stage <my_images_stage>
  encryption=(type=SSE)

where "SSE" stands for server-side-encrypted, which is a term that is discussed above. Or the customer may create an external stage 520 using the following example commands:

create stage <my_images_stage>
  stage_URL='s3://example_bucket/my_images_stage' where the form of the stage URL that is depicted uses AWS as an example cloud-storage platform 518, and where "s3://example_bucket" is a placeholder for text such as:

https://example_bucket.s3.amazonaws.com

Those of skill in the art will appreciate that different cloud platforms have different syntaxes. Whether an internal stage 514 or an external stage 520, the customer now has created a stage that is called "my_images_stage." It is noted that, if my_images_stage is an internal stage 514, it still has a stage URL, but one that is determined by the database platform 500 and is not explicitly set or provided by the user that creates the internal stage 514.

Returning to the function get_relative_path( ) in an example scenario, a customer may create two top-level (i.e., top level with respect to the stage) folders in my_images_stage called "landscapes" and "skylines," and the customer may store, as an example, fifty image files respectively named "image01.jpg" through "image50.jpg" in the "landscapes" folder and thirty images files respectively named "image51.jpg" through "image80.jpg" in the "skylines" folder. Thus, assuming for this example scenario that my_images_stage is an external stage 520 created with the example commands that are shown above, an example absolute path of an example file "image27.jpg" on that external stage 520 is:

s3://example_bucket/my_images_stage/landscapes/image27.jpg

As the term is used in the present disclosure, the relative path for that external file is: /landscapes/image27.jpg Moreover, the stage name is my_images_stage, and the stage URL is:

s3://example_bucket/my_images_stage

Thus, a function call such as:

select get_relative_path
  (
  my_images_stage,
  's3://example_bucket/my_images_stage/landscapes/image27.jpg'
  );

would, in this example scenario, return the string /landscapes/image27.jpg as the relative path of that file with respect to that stage.

The function get_relative_path( ) may operate at least in part by referencing the my_images_stage database object, identifying 's3://example_bucket/my_images_stage' as the stage URL of that stage, and returning the terminal portion (i.e., the substring) of the provided absolute path that comes after the identified stage URL of the external stage 520. In at least one embodiment, the database platform 500 imposes a restriction on the function get_relative_path( ), which is that the provided absolute path be a sub-path of the stage URL of the stage that has the provided stage name. As an example, the absolute path 's3://example_bucket/my_images_stage/landscapes/image27.jpg' is a sub-path of the stage URL 's3://example_bucket/my_images_stage.' Furthermore, in at least one embodiment, any user that has usage privileges on the relevant stage is permitted by the database platform 500 to call the function get_relative_path( ).

Function: get_absolute_path( )

Another function that may be provided by the database platform 500 in at least one embodiment is a function that is referred to herein as get_absolute_path( ) which enables users to obtain the absolute path of a given (internal or external) file that is stored on a given internal stage 514 or external stage 520. In at least one embodiment, the function get_absolute_path( ) takes two arguments: (1) the name of an internal stage 514 or an external stage 520 and (2) the relative path of a file that is stored on that internal stage 514 or external stage 520. A call of the function get_absolute_path( ) may take the form of:

```
select get absolute_path
(
stage_name,
'relative_path'
);
```
In at least one embodiment, the function get_absolute_path( ) returns the absolute path of the file on the stage as a string. Continuing the above example scenario in which my_images_stage is an external stage 520, a user may make the following example function call:
```
select get_absolute_path
(
my_images_stage,
'/landscapes/image27.jpg'
);
```
In this example scenario, this function call would return the string s3://example_bucket/my_images_stage/landscapes/image27.jpg as the absolute path of that file. The function get_absolute_path( ) may operate at least in part by referencing the my_images_stage database object, identifying s3://example_bucket/my_images_stage as the stage URL of that stage, concatenating that stage URL and the provided relative path in that order, and returning the result of that concatenation operation as a string. In at least one embodiment, any user that has usage privileges on the relevant stage is permitted by the database platform 500 to call the function get_absolute_path( )

Function: get_presigned_URL( )

Another function that may be provided by the database platform 500 in at least one embodiment is a function that is referred to herein as get_presigned_URL( ) which enables users to obtain what is known as a presigned URL for a given file that is stored on a given internal stage 514 or external stage 520. As is known to those of skill in the relevant arts, a presigned URL, which is also known as a "signed URL" and by other names, is a type of URL that is used to grant (typically temporary) access to an object (e.g., a file) that resides at a specific network location. The application, function, driver, and/or the like that creates a presigned URL for a given file typically includes, in that presigned URL, one or more specific parameters that facilitate the desired limited access to the file.

Building on the above examples in which my_images_stage is an external stage 520, and again using AWS syntax by way of example, a presigned URL for the example file 'image27.jpg' might take a form similar to the following:

https://example_bucket.s3.amazonaws.com/my_images_stage/landscapes/image27.jpg?X-Amz-Algorithm=AWS4-HMAC-SHA256&X-Amz-Credential=E98AWK %2F20200626%2Fus-west-2%2Fs3%2Faws4_request&X-Amz-Date=20200626T232419Z&X-Amz-Expires=7200&X-Amz-Signature=67e0c9ef01807d04p76w0460f Other parameters could be included instead of or in addition to one or more of those shown above and described below. For clarity of presentation, the above example presigned URL is shown below with each parameter starting on its own line, whereas an operative version of a presigned URL such as this would be one contiguous string of characters such as is shown above.

http s://example_bucket. s3. amazonaws. com/my_images_stage/landscapes/image27.jpg?
   X-Amz-Algorithm=AWS4-HMAC-SHA256 &
   X-Amz-Credential=E98AWK [%2F]20200626 [%2F]us-west-2 [%2F]s3 [%2F]aws4_request &
   X-Amz-Date=20200626T232419Z &
   X-Amz-Expires=7200 &
   X-Amz-Signature=67e0c9ef01807d04p76w0460f The first line (containing the absolute path) ends with the "?" character that conventionally separates the absolute path from one or more parameters in URLs. Also, each parameter line ends with the "&" character that conventionally separates URL parameters from one another. The "?" and each "&" are preceded by a space for visual clarity, though that space would not be there in an operative presigned URL. Additionally, the multiple values in the "X-Amz-Credential" parameter are separated by the 3-character string "%2F," which is the URL-encoded version of the forward slash ("/") character. And even though there would be no spaces in an operative presigned URL, each "%2F" is enclosed in square brackets that are each preceded and succeeded by a space in the above example simply for a clearer visual presentation. Neither those spaces nor those square brackets would appear in an operative version of this example presigned URL. Moreover, it is noted that the pseudorandom character strings in the "X-Amz-Credential" parameter and the "X-Amz-Signature" parameter could and likely would be longer in a real, fully operative presigned URL: those parameters were shortened to facilitate presentation of this example.

The "X-Amz-Algorithm" parameter being set to "AWS4-HMAC-SHA256" indicates that a Secure Hash Algorithm (SHA) known as "SHA-256" was the hash algorithm that was used to generate the below-described digital signature of this example presigned URL. As known to those of skill in the art, AWS4-HMAC-SHA256, which is also known as "Signature Version 4" or just "V4," is an authentication scheme that is supported by AWS S3.

The "X-Amz-Credential" parameter starts with the string "E98AWK," which represents the security credentials (a.k.a. access key, access token, and/or the like) that is embedded in this example presigned URL for accessing the file "image27.jpg." The credential parameter next includes (i) "20200626," which indicates Jun. 26, 2020 as the date on which this example presigned URL was generated; (ii) "us-west-2," which is what is known as the "aws-region string" of the example presigned URL; (iii) "s3," which is what is known as the "aws-service string" of the example presigned URL; and (iv) "aws4_request," which is what is known as the "termination string" of the example presigned URL.

The "X-Amz-Date" parameter is set to "20200626T232419Z," which indicates that the example date and time (i.e., the timestamp) at which this example presigned URL was created is Jun. 26, 2020 at 23:24:19 (i.e., 11:23 p.m. (and 19 hundredths of a second)). This timestamp is expressed in what is known as the International Organization for Standardization (ISO) 8601 format, where the "T" is a delimiter between the date and the time, and where the "Z" represents what is known as the "Zero time zone" in that it is not offset (i.e., it is offset by zero hours) from what is known as the Coordinated Universal Time (UTC) (a.k.a. "Zulu time"). In at least one embodiment, the "X-Amz-Date" parameter is an input into the above-described hash algorithm.

The "X-Amz-Expires" being set to "7200" indicates that this example presigned URL was set to expire 7200 seconds (i.e., 2 hours) after the timestamp described above. In many implementations, an expiration-time field can be omitted from a presigned URL, in which case a default value (e.g., 3600 seconds (i.e., 1 hour)) is imposed. Other default values could certainly be set. Moreover, it would also be possible to implement non-expiring presigned URLs, though this may be less desirable from a security perspective.

Finally, the "X-Amz-Signature" parameter being set to "67e0c9ef01807d04c76a0460f" indicates that that pseudo-random string of alphanumeric characters is the (e.g., hexadecimal-encoded) digital signature, which is a security parameter, of this example presigned URL. This value is typically computed by the hash algorithm that is specified in the above-described "X-Amz-Algorithm" parameter. In some cases, a data item known as a "security policy" is the input to that hash algorithm, along with the above-described timestamp. Other hash algorithms (or another type of algorithm) and/or other inputs could be used to generate digital signatures in various different embodiments.

Returning to the definition of the function get_presigned_URL( ) in at least one embodiment, the function takes either two or three arguments, depending on whether the optional expiration-time parameter is specified. If it is, the function takes three arguments. If it is not, the function takes two arguments. Thus, in at least one embodiment, the arguments of the function get_presigned_URL( ) are (1) the name of an internal stage 514 or an external stage 520, (2) the relative path of a file that is stored on that internal stage 514 or external stage 520, and, optionally, (3) an expiration time (expressed in at least one embodiment as an integer number of seconds). A call of the function get_presigned_URL( ) may take the form of:

select get_presigned_URL
(
stage_name,
'relative_path'[,
expiration_time]
);

where the "expiration_time" parameter and its preceding comma are shown in single square brackets to indicate that that parameter is optional. In at least one embodiment, get_presigned_URL( ) returns, as a string, a presigned URL for the file that is located in the specified stage at the specified relative path. In some implementations, a specific data type may be defined to contain presigned URLs. Continuing with the above-described example scenario in which my_images_stage is an external stage 520, a user may make the following example function call:

select get_presigned_URL
(
'my_images_stage',
'/landscapes/image27.jpg',
7200
);

This example function call may result in the function get_presigned_URL( ) returning the above-described example presigned URL for this file. The function get_presigned_URL( ) may operate at least in part by carrying out the functionality of—or simply calling—the function get_absolute_path( ) with the first two parameters that are passed into the function get_presigned_URL( ) and then assembling the presigned URL to have parameters similar to those described above. For example, as part of performing its operations, the function get_presigned_URL( ) may hash a security policy or other value together with a current or future timestamp to derive the digital signature to include in the presigned URL. It is further noted that presigned URLs can be HTTP or HTTPS URLs, and a function such as get_presigned_URL( ) can be implemented either way. In some embodiments, the function get_presigned_URL( ) could be implemented such that the absolute path of a given file is passed into the function instead of both the stage name and the relative path. Other permutations are possible as well. In at least one embodiment, any user that has usage privileges on the relevant stage is permitted by the database platform 500 to call the function get_presigned_URL( )

Moreover, the function get_presigned_URL( ) can be used in a materialized view. In at least one embodiment, in such a case, the database platform 500 imposes a restriction that the owner role of the view have usage privileges on the associated stage in order for other roles to be able to query the view and get the presigned URL of one or more files. As an example, the following two roles may exist in a given implementation:

a data_engineer_role that created a given view, therefore owns it, and has usage privileges on the associated stage; and a data_analyst_role that has select privileges on the view, but does not have usage privileges on the stage.

In at least one embodiment, in this scenario, users having the data_analyst_role can are permitted by the database platform 500 to query the view and get the presigned URL of an associated file. When using internal stages 514 that are server-side-encrypted but not client-side-encrypted, users are able in at least one embodiment to use the function get_presigned_URL( ) to obtain presigned URLs for files for use by human users, and also for use in drivers, applications, services, and/or any other suitable data-handling code.

table function: list_files( )

Another function that may be provided by the database platform 500 in at least one embodiment is a function that is referred to herein as list_files( ) which enables a user (e.g., a customer) of the database platform 500 to obtain a list of all of the files in a given internal stage 514 or external stage 520 in the form of a database table. In at least one embodiment, the list_files( )) function is what is known as a "table function," in that it is a function that returns a table database object. The list_files( ) function in this example description takes a single argument: a stage database object, which could correspond to either an internal stage 514 or an external stage 520. Other implementations could be used as well, such as implementations in which the function list_files( )) takes a stage name, a stage URL, or another stage identifier. In the example syntax that is used in this disclosure, a stage database object is represented by the stage name prepended with the "@" symbol—e.g., @my_images_stage. As stated, in at least one embodiment, the table function list_files( )) returns a table that lists all of the files in the relevant stage. In at least one embodiment, any user that has usage privileges on the relevant stage is permitted by the database platform 500 to call the function list_files( ).

Being a table function in at least one embodiment, list_files( )) enables users to take advantage of the table-related features provided by the database platform 500. Thus, as examples, once the file-catalog information is funneled into a table by the list_files( ) function, users can select over that table, filter over that table, create customized materialized views on that table, apply predicates to that table, and/or the like. A call of the function list_files( ) may take the form of:

select*from table
(
list_files
(
@stage_name
)
);

where the "table( . . . )" syntax is used by way of example to indicate to the database platform 500 that a table database object is what is inside the parentheses in "table( )" Continuing the above example scenario, a user may make the following example function call:

select*from table
    (
    list_files
    (
    @my_images_stage
    )
    );

Example results of that function call are described below.

Figure 6:
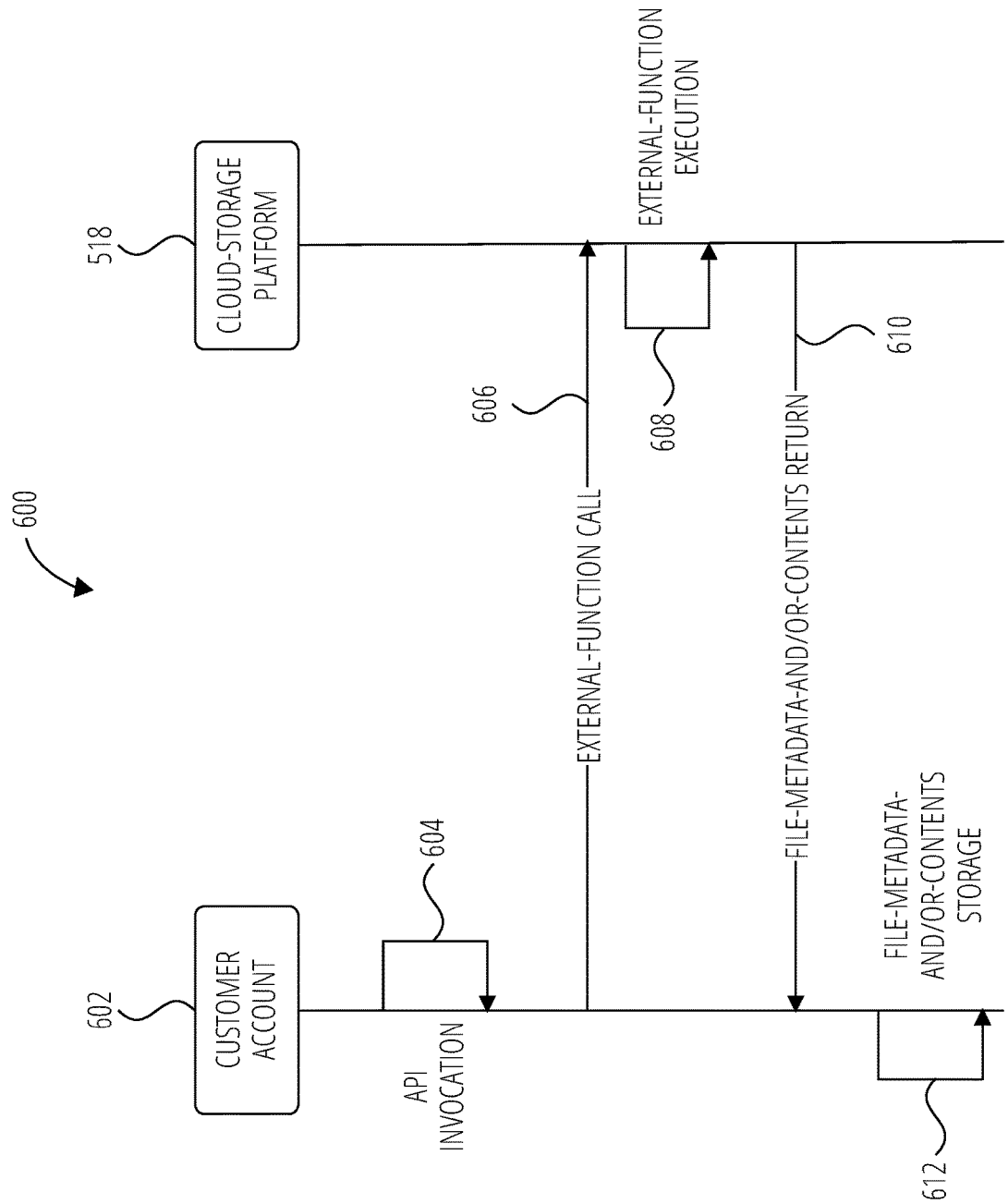
FIG. 6 illustrates an example message flow, in accordance with at least one embodiment.

FIG. 6 shows an example message flow 600 in which a customer account 602 at the database platform 500 is used to invoke an API to call an external function. A user in the customer account 602 makes an API invocation 604, which results in an external-function call 606. The external-function call 606 results in the cloud-storage platform 518 carrying out an external-function execution 608, which in turn results in a file-metadata-and/or-contents return 610 from the cloud-storage platform 518 to the customer account 602. Following the file-metadata-and/or-contents return 610, the customer account 602 carries out a file-metadata-and/or-contents storage 612. The external-function call 606 and the file-metadata-and/or-contents return 610 could be accomplished using one or more HTTP/TLS connections. Further details regarding the manner in which one or more of these steps could be carried out are discussed below. For example, the execution of a task that references a stream on a table or stage could involve the API invocation 604 and the external-function call 606, which in turn result in the external-function execution 608, the file-metadata-and/or-contents return 610, and the file-metadata-and/or-contents storage 612.

Stream

Once the above-described API integration and external-function database object have been created, the customer can continue the construction of a file-metadata-ingestion pipeline by creating what is known as a stream, in this case a stream on the table named image_file_catalog_table, using syntax such as:

create stream image_file_catalog_stream
    on
    table image_file_catalog_table;

This example stream may be referred to as a "table stream," in that it is a stream that is created on a particular table, in this case image_file_catalog_table, which is referred to as the "source table" for the created stream, which, as shown above, is named image_file_catalog_stream. As a general matter, a stream records data-manipulation-language (DML) changes made to a table, including information about inserts, updates, and deletes. That information is also referred to in the art as change-data-capture (CDC) information. The manner in which this created stream could be used in example embodiments is further described below.

Task

The example customer could continue constructing the above-referenced file-metadata-ingestion pipeline by creating a task database object named 'image_file_metadata_task' using syntax such as:

create task image_file_metadata_task
    warehouse=my_warehouse
    as
    insert into image_file_catalog_table
    ( select
    get_image_metadata_ext_function(file_URL):file_name,
    get_image_metadata_ext_function(file_URL):image_format,
    get_image_metadata_ext_function(file_URL):x_dimension,
    get_image_metadata_ext_function(file_URL):y_dimension,
    get_image_metadata_ext_function(file_URL):is_drawing,
    get_image_metadata_ext_function(file_URL):is_black_and_white,
    get_image_metadata_ext_function(file_URL):tags,
    get_image_metadata_ext_function(file_URL):dominant_color,
    get_relative_path('@my_images_stage', file_URL)
    from
    image_file_catalog_stream
    where
    metadata$action='insert'
    )
    ;

The syntax "merge into" can be used instead of "insert into" in the above task-creation command in at least one embodiment. Moreover, it is noted that the condition "where metadata$action='insert'" is an example of how the "metadata$" prefix is available in some embodiments of the database platform 500 to reference metadata that is identified, controlled, and made available by the database platform 500. In at least one embodiment, customers can use such syntax but cannot alter or delete the associated metadata items (e.g., metadata columns).

In at least one embodiment, at least two "metadata$" columns are provided by the database platform 500: "metadata$action" and "metadata$is_update." Moreover, at least two "metadata$action" values are supported in an embodiment: 'insert' and delete.' Others could be supported as well. The metadata$is_update column may store a Boolean value indicating whether the metadata$action of 'insert' or 'delete') in the corresponding row in the table stream was part of an update to one or more rows in the source table (i.e., in image_file_catalog_table). Such an update may correspond to a file being replaced on the cloud storage, which, in at least one implementation, triggers both a delete notification and an insert notification.

In at least one embodiment, whenever the task is executed, it will retrieve metadata for each newly inserted image file in the stage and insert that retrieved metadata into the table named image_file_catalog_table, along with inserting the result of the get_relative_path( ) function shown above into a file-URL column. In at least one embodiment, the above task will make only a single call to the above-defined external function named 'get_image_metadata_ext_function.' It is noted that the files processed by a given external function can be internal files or external files. In the case of internal files, in some embodiments, such files can be processed by JavaScript procedures and/or Java functions.

Stage Enhancements

This section of the disclosure describes several enhancements that are available during external-stage creation in accordance with at least one embodiment.

Built-In File-Catalog Table

In at least one embodiment, when creating either an internal stage 514 or an external stage 520, a user can elect to instruct the database platform 500 to create a built-in file-catalog table, which may have a schema (and example content) similar to what is depicted and described herein in connection with a file-catalog, but would instead be managed and controlled by the database platform 500, while still being available to users (e.g., customers). Thus, in at least one embodiment, a customer would not have permissions to alter a built-in file-catalog table, drop (i.e., delete) a built-in file-catalog table, and the like, and the schema of the table is defined by the database platform 500. In some embodiments, a special type of stage (other than simply "internal" and "external") could be implemented for stages that include a built-in file-catalog table, though that is not the type of embodiments that are described below.

In at least one embodiment, the user may elect the option of having the database platform 500 create a built-in file-catalog table in an internal stage 514 using syntax such as the following when creating the stage:

create stage <my_images_stage>
encryption=(type=SSE)
store_file_catalog=true

Thus, the user can elect this option by setting a flag such as store_file_catalog to true. If the user does not want to elect this option, the user could set store_file_catalog to false. In some embodiments, if the user does not specify a value for a flag such as store_file_catalog, a default value (which could be true or false in various different implementations) is selected for the user. For an external stage 520, the user may elect this option using syntax such as the following:

create stage <my_images_stage>
stage_URL='s3://example_bucket/my_images_stage'
store_file_catalog=true In at least one embodiment, when store_file_catalog is set to true for either an internal stage 514 or an external stage 520, the database platform 500 responsively creates a built-in file-catalog table for the stage and stores the file catalog in that table. As stated, the built-in file-catalog table could have the same schema as the file-catalog table (named 'file_catalog_table' in this disclosure), which is also the example schema presented herein for the list_files( ) function. In at least one embodiment, once the store_file_catalog flag has been set to true (during or, in some embodiments, after, stage creation), the database platform 500 does not permit the user to change that value; in other embodiments, the database platform 500 does permit the user to change that value, in which case the database platform 500 may delete the built-in file-catalog table from the associated stage. In at least one embodiment, in stages that have a built-in file-catalog table, users can select from this table, create materialized views on this table, and/or the like.

Thus, in at least one embodiment, the structure of a built-in file-catalog table includes, like the file-catalog table discussed above, a row that corresponds to each file in the associated stage. The structure in at least one embodiment also includes a number of columns that include metadata about the files. These could be the same columns that are shown in the file-catalog table for example, and those would be the columns that, in at least one embodiment, would be returned if a user did a "select*" from the built-in file-catalog table.

In at least one embodiment, the database platform 500 also maintains one or more platform-controlled metadata columns on the built-in file-catalog table and grants access to platform-controlled metadata columns using a syntax such as the "metadata$" syntax described above. In some embodiments, the database platform 500 maintains at least the following platform-controlled metadata columns on the built-in file-catalog table, in some cases in addition to one or more others:

metadata$filename
metadata$relative_path
metadata$presigned_URL where the metadata$filename column may contain the name of the file corresponding to that row, metadata$relative_path may contain the same string as would be returned by the function get_relative_path( ) when called with its arguments set to (i) the name of the associated stage and the (ii) absolute path of the file corresponding to that row in the built-in file-catalog table, and metadata$presigned_URL may contain the same string (i.e., the same presigned_URL) that would be returned by the function get_presigned_URL( ) when called with its arguments set to (i) the name of the associated stage and (ii) the relative path on that stage of the file corresponding to that row in the built-in file-catalog table.

Figure 7:
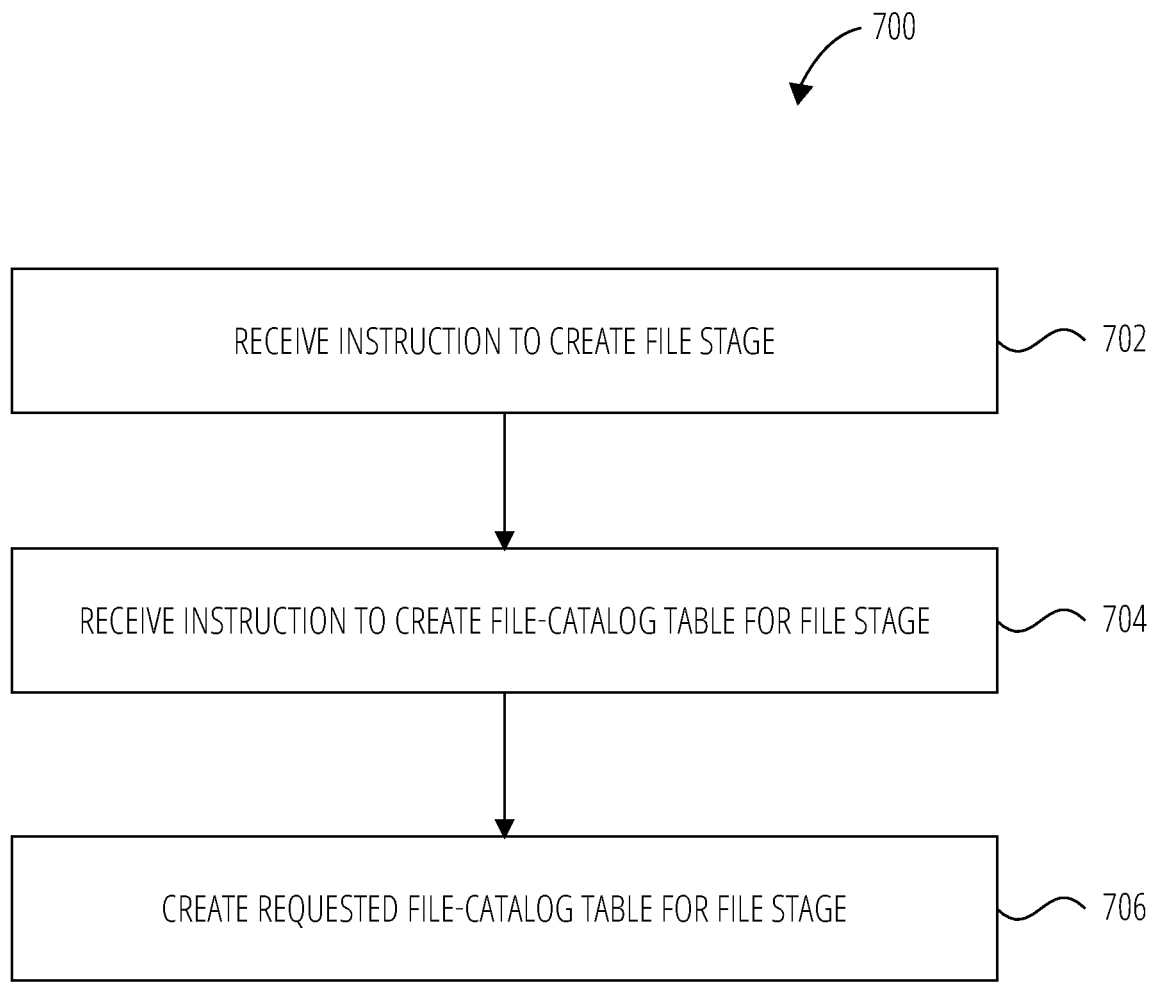
FIG. 7 illustrates an example method, in accordance with at least one embodiment.

FIG. 7 illustrates an example method 700, in accordance with at least one embodiment. In various different embodiments, the method 700 could be performed by any computing and communication device or system of such devices that is suitably equipped, programmed, and configured to perform the operations described herein. In some embodiments, all or part of the method 700 is performed by the database manager 502, which may involve one or more aspects of the method 700 being performed by the resource manager 504, one or more aspects of the method 700 being performed by the execution platform 506, and/or one or more aspects of the method 700 being performed by one or more other functional components of the database manager 502. By way of example and not limitation, the method 700 is described below as being performed by the database manager 502 of the database platform 500.

At operation 702, the database manager 502 receives a stage-creation instruction from a client 516. The stage-creation instruction requests creation by the database platform 500 of creation of a file stage in a user (e.g., customer) account on the database platform 500, where the user account is associated with the client 516.

At operation 704, the database manager 502 receives a file-catalog-table-creation instruction from the client 516. The file-catalog-table-creation instruction requests creation by the database platform of a file-catalog table in the file stage, where the file-catalog table contains one or more metadata items corresponding to one or more files in the file stage that was requested to be created at operation 702.

At operation 706, the database manager 502, in response to receiving the file-catalog-table-creation instruction at operation 704, creates the requested file-catalog table in the file stage.

The file stage could be internal or external. The requested file-catalog table could be user-defined or could be a built-in file-catalog table. The file-catalog-table-creation instruction that is received at operation 704 could be part of the stage-creation instruction that is received at operation 702; that is, the file stage could be requested as part of the instruction to create the stage. In other embodiments, the file-catalog-table-creation instruction that is received at operation 704 is received after stage creation, e.g., using a "create table" syntax and then populating the created table using a function such as list_files( ) One or more streams could be created on one or more tables, and one or more tasks could be created with respect to one or more streams. External functions could be employed via API integrations. Furthermore, any one or more of the numerous options described herein could be present in one or more embodiments of the method 700. Moreover, numerous other methods could be defined as well.

Figure 8:
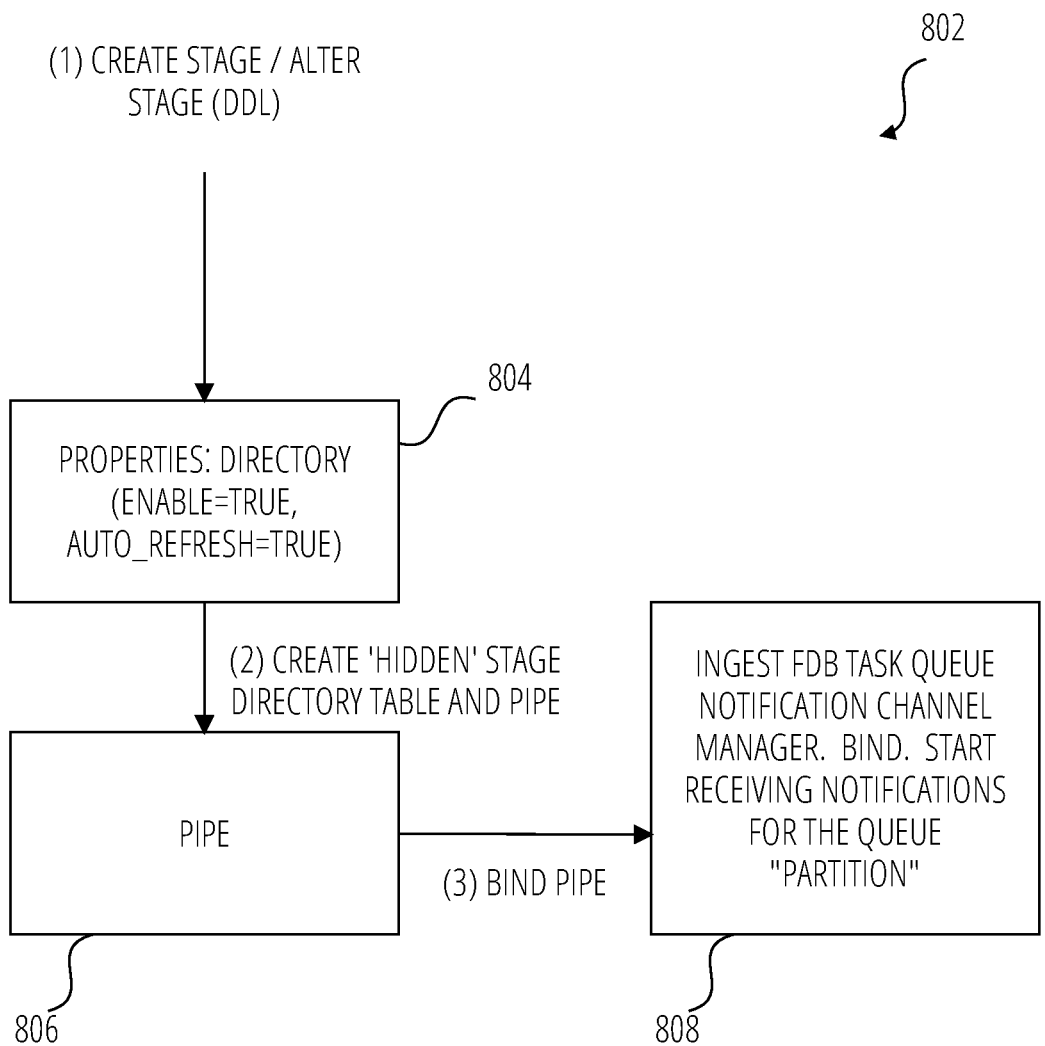
FIG. 8 illustrates an example operation for receiving notifications for a queue partition in accordance with one example embodiment.

FIG. 8 illustrates an example process 802, in accordance with at least one embodiment. In various different embodiments, the process 802 could be performed by any computing and communication device or system of such devices that is suitably equipped, programmed, and configured to perform the operations described herein. In some embodiments, all or part of the process 802 is performed by the database manager 502, which may involve one or more aspects of the process 802 being performed by the resource manager 504, one or more aspects of the method 700 being performed by the execution platform 506, and/or one or more aspects of the method 700 being performed by one or more other functional components of the database manager 502. By way of example and not limitation, the process 802 is described below as being performed by the database manager 502 of the database platform 500. In (1), the database manager 502 creates a stage or alters an existing stage. At process 804, the database manager 502 defines properties of the stage (e.g., properties: director (enable=true, auto_refresh=true). At (2), the database manager 502 creates a "hidden" stage directory table and identifies a pipe corresponding to a customer account 602 of the stage. The database manager 502 binds the pipe 806 in (3) to ingest FDB task queue notification channel managers in process 808. For example, in process 808, the database manager 502 binds the identified pipe 806 and start receiving notification for the queued "partition."

Figure 9:
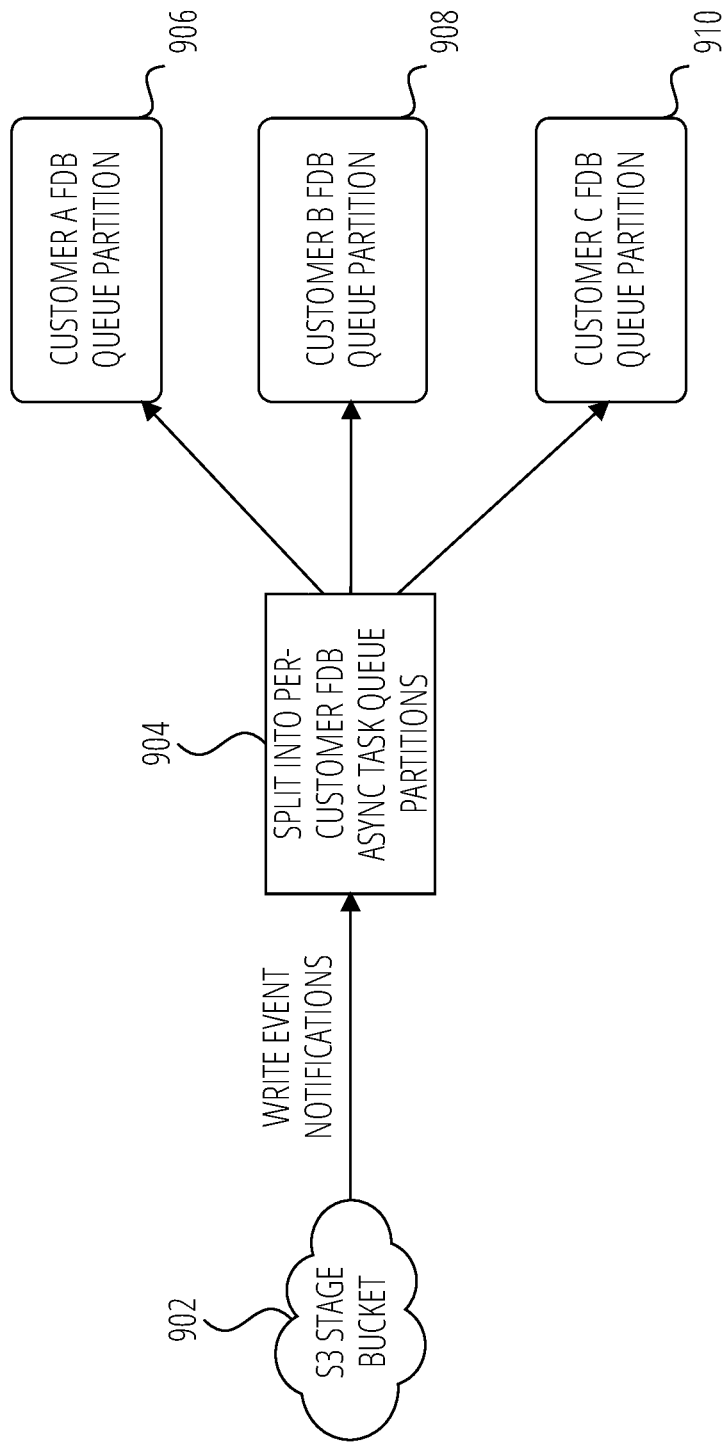
FIG. 9 illustrates an example operation for receiving event notifications in accordance with one example embodiment.

FIG. 9 illustrates an example operation for receiving event notifications in accordance with one example embodiment. Deployments may be hosted on external cloud services (e.g., S3 stage bucket 902) such as (S3) AWS, Azure, and GCS.

AWS Deployment Setup

Each Snowflake deployment running in a 'Compute' AWS account can have multiple associated 'DataStore' or 'DS' AWS accounts. There is a stage bucket per each DS AWS account, along with a bucket for other storage types (e.g., viz., FDN table storage and transient storage). Multiple Snowflake customers are multiplexed onto the same stage storage bucket with each Snowflake customer mapped to a unique S3 prefix. The stage bucket is used for different use-cases:

UI worksheets: S3-Stage-Bucketkcustomer-unique-prefix>/users/<prefix>/worksheet data/

Query-Results cache:S3-Stage-Bucket/<customer-unique-prefix>/results/<result_query_id>/

Internal stage: S3-Stage-Bucket/<customer-unique-prefix>/stages/<stage_unique_id>/ . . .

Azure Deployment Setup

Each Snowflake customer account has a separate Azure storage account for stage volume. Separate containers are dynamically created for each internal stage. Containers can be separately permissioned/sub-scoped with SAS tokens.

GCS Deployment Setup

Each customer gets their own bucket for their stage volumes.

The database manager 502 creates an SQS queue for each DS AWS account to receive stage bucket PUT/DELETE event notifications. Background GS cluster polls the S3 stage bucket 902 for PUT/DELETE event notification SQS [one per each DS AWS account] and routes the S3 event notification message to the corresponding FDB Async task queue partition for that customer (if it exists) or dropping them(e.g., non-stage file events) (illustrated by split into per-customer FDB async task queue partitions 904): customer A FDB queue partition 906, customer B FDB queue partition 908, customer C FDB queue partition 910.

Figure 10:
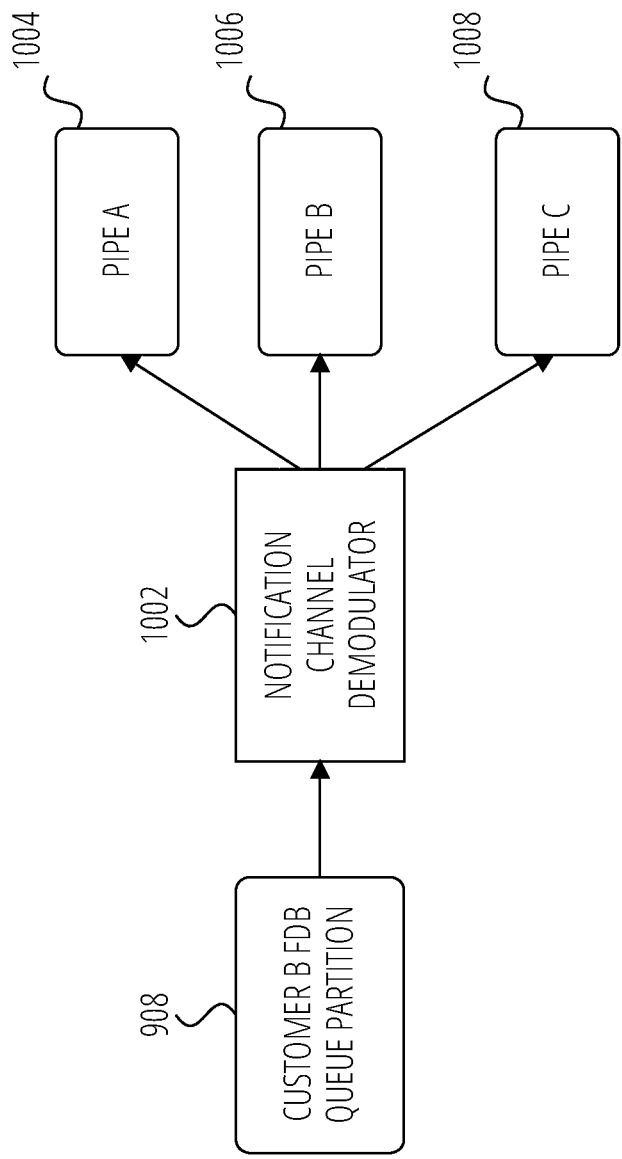
FIG. 10 illustrates an example operation for identifying a corresponding pipe in accordance with one example embodiment.

FIG. 10 illustrates an example operation for identifying a corresponding pipe in accordance with one example embodiment. Once the customer B FDB queue partition 908 is identified, an ingest operation processes the FDB Async task queue (e.g., customer B FDB queue partition 908) as a new ingest notification channel and directs the S3 notification events to the corresponding pipes' processor (e.g., pipe A 1004, pipe B 1006, pipe C 1008). Once an S3 event is matched to a pipe, the rest of the processing uses the existing Ingest process (illustrated in FIG. 11).

As such, per-customer queue partition helps prevent a single customer from spamming the ingest processing. Customer partitioned queue for internal stages is different from the per-customer SQS created for external stages/snowpipes. Per-customer queue ingest processing is sharded across GS Ingest cluster nodes using consistent hashing.

DS Stage bucket(s)-S3 Event Notification SQS poller

This is decoupled from the existing Ingest layer. When a pipe is created for an internal stage first time for the customer account, Ingest Notification Channel Manager gets the DS AWS account ID from the IAM user mapped to the Snowflake customer using sts::get_caller_identity( ) SQS S3 event notification queue name is the same in all DS accounts. This is persisted in FDB, S3StageBucketEventNotificationQueueDPO. Key is (String) DS AWS accountID, Value is the S3 stage bucket event notification SQS ARN (String). There are no credentials required for sts::get_caller_identity, so existing GS instance profile role credentials should suffice. Since there are a few DS accounts per deployment, this can be cached in memory.

The S3 event notification unique prefix mapped to a customer is hashed to be the queue partition id.

Since the number of DS AWS accounts per deployment are at most handful (the max is VA with 30+DS accounts), in each poller thread, cycle through all the DS account queues. This is simpler than any affinity mechanism achieved through consistent hashing.

Ingest Layer Changes

New ingest channel manager, receiver and demodulator (e.g., notification channel demodulator 1002) are added for processing the FDB AsyncTask queue notifications.

IngestNotificationChannelDPO slices:

1. AWS_BUCKET_ACCOUNT_REGION_INDEX_SLICE. The composite keys are: (Long) accountId, (String) S3 Bucket ARN, (String) S3 Bucket Region. This is a good composite key for the internal stage notifications as well.

2. CHANNEL_BY_ACCOUNT_SLICE. This is used by IngestNotificationalChannelAbstrctSupplier to populate a cache map used in the distribution of queue partitions/channels across GS instances in the ingest cluster.

3. PIPE_INDEX_SLICE. Composite Keys are PipeId and NotificationId. There can be more than one pipe per-customer queue partition. Each internal stage uses its own pipe for auto-refresh. There can even be multiple pipes processing notification from the same internal stage.

1. This slice is used for cloning pipes. The property values that are not applicable to internal stages—"External_Stage" and "Integration_ID".
  2. IngestNotificationalChannelAbstractSupplier does a batch visit on the PIPE_INDEX_SLICE to get a list of Ingest Notification Channels assigned to the GS instance (determined by consistent hashing scheme on channel id) to build the in-memory lookup map to use while processing s3 event notification (StageFilePathByPipeId).

4. PIPES_TO_UPDATE_SLICE. Composite Keys: NOTIFICATION_ID, PIPE_ID. This is a transient slice and is used to notify GSes to update their pipes that show up under this slice. On a watch trigger, all polling GSes will wake up, read all entries from this slice and delete entries for which vnodes they own (see below section on VNodes). They will then read these Pipes from the pipe_index_slice to update internal data structures.

IngestNotificationChannel.java::getPipesListForPath can be used as-is used to match the set of pipes that match the incoming S3 event notification file path.

Authorization Model: Resource Based Authorization

SQS event notification queue in DS account(s) have a cross-account resource based IAM policy that allow GS' instance profile role to perform sqs:DeleteMessage, sqs:ReceiveMessage and sqs:PurgeQueue (the last one is for troubleshooting). GS's instance profile in the Compute AWS account needs to allow the SQS operations (sqs:DeleteMessage, sqs:ReceiveMessage and sqs:PurgeQueue) for each of the DS Account's notification queues. There are no credentials to persist/pass around.

Figure 11:
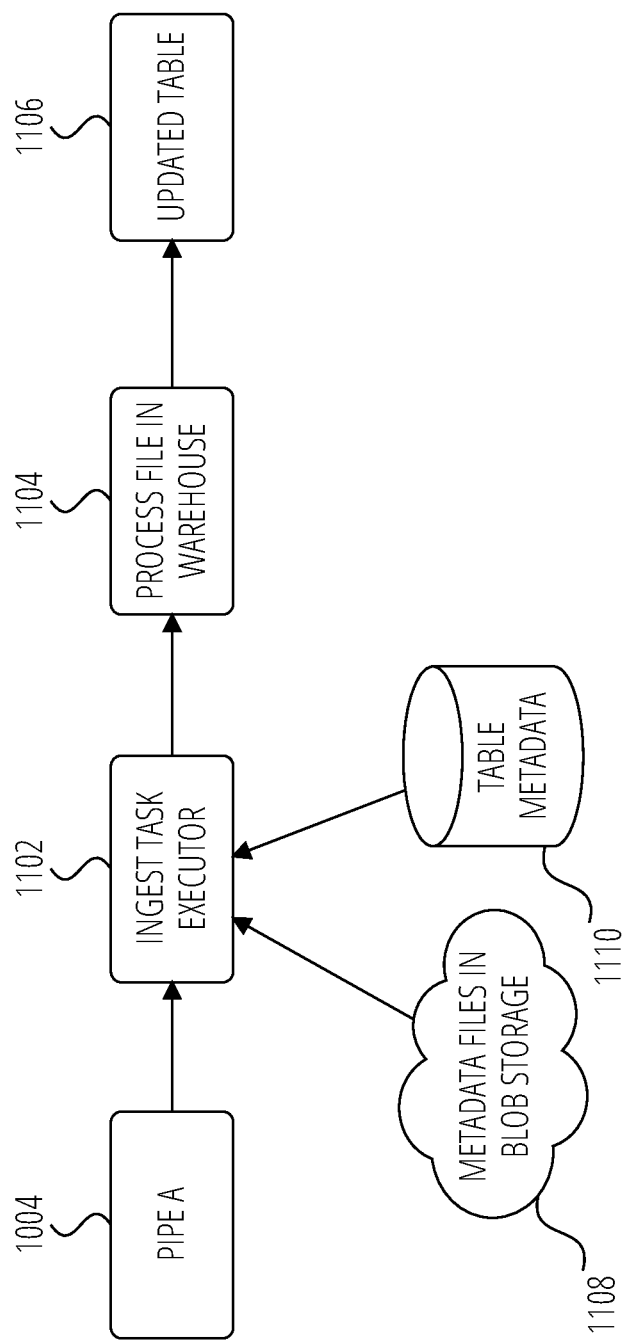
FIG. 11 illustrates an example operation for updating a table for a corresponding pipe in accordance with one example embodiment.

FIG. 11 illustrates an example operation for updating a table for a corresponding pipe in accordance with one example embodiment. Ingest task executor 1102 processes pipe A 1004 (in table A) based on data from metadata files in Blob storage 1108 (e.g., metadata files associated with the table in Blob storage for registered external files associated with table A and metadata including LastModifiedTime and table metadata 1110 (persistence). In another example embodiment, the Ingest task executor 1102 rejects out-of-order file notifications for updates.

Optionally, process file in warehouse 1104. The files are processed at a warehouse used only for external files ingested to regular tables that need transformation of data inside files.

The Ingest task executor 1102 process results in updated table 1106.

Figure 12:
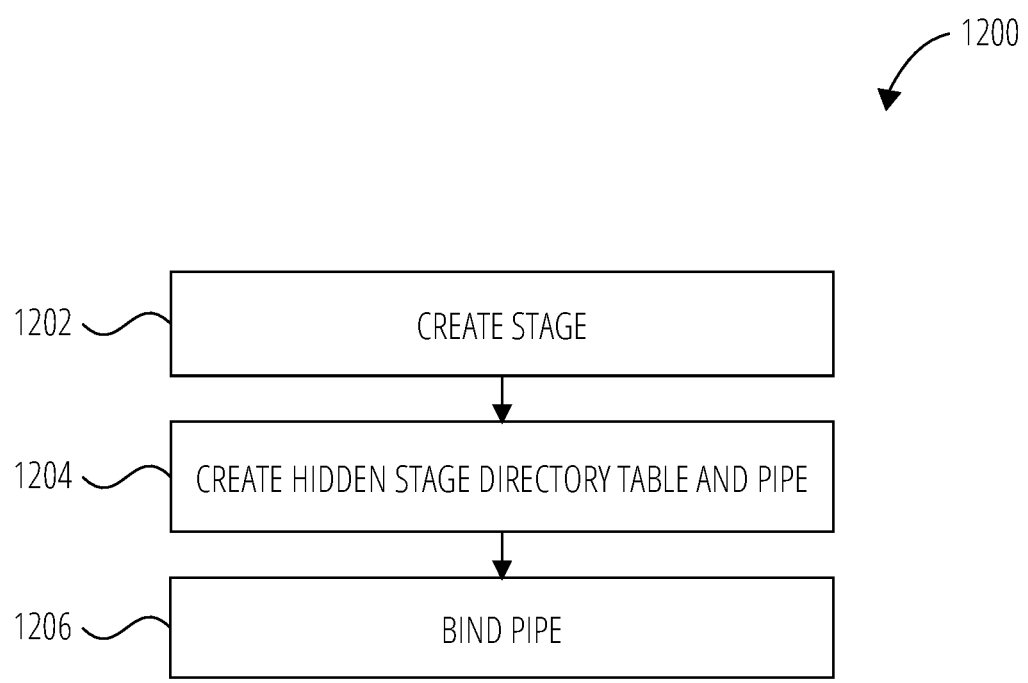
FIG. 12 illustrates an example method for binding a data pipeline, in accordance with at least one embodiment.

FIG. 12 illustrates an example method 1200, in accordance with at least one embodiment. In various different embodiments, the method 1200 could be performed by any computing and communication device or system of such devices that is suitably equipped, programmed, and configured to perform the operations described herein. In some embodiments, all or part of the method 1200 is performed by the database manager 502, which may involve one or more aspects of the method 1200 being performed by the resource manager 504, one or more aspects of the method 1200 being performed by the execution platform 506, and/or one or more aspects of the method 1200 being performed by one or more other functional components of the database manager 502. By way of example and not limitation, the method 1200 is described below as being performed by the database manager 502 of the database platform 500.

Figure 13:
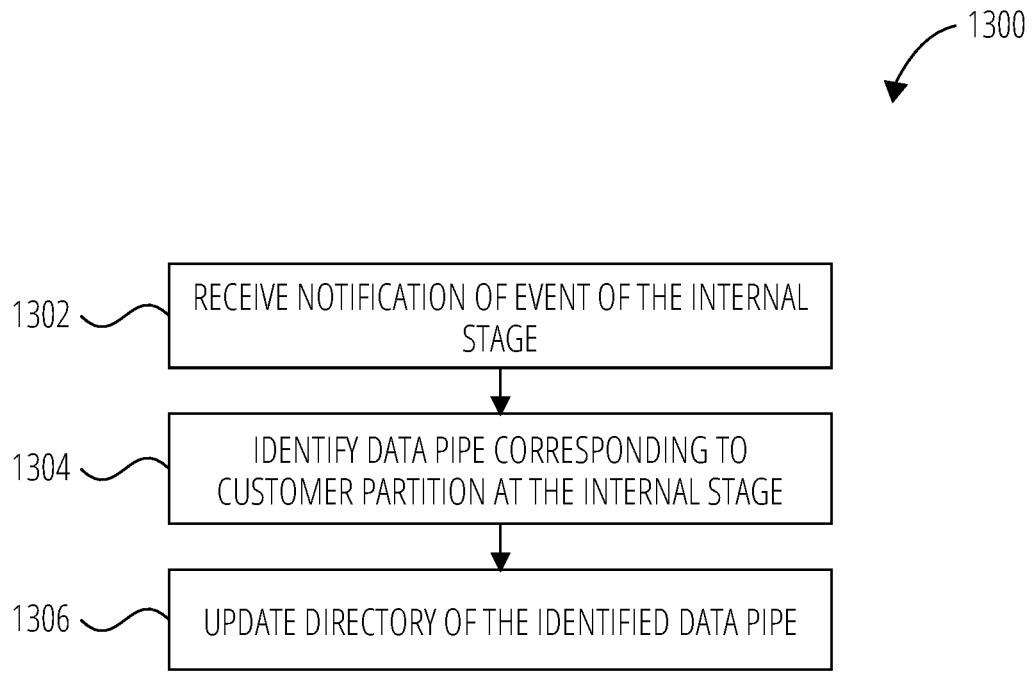
FIG. 13 illustrates an example method for updating a directory table of the data pipeline, in accordance with at least one embodiment.

FIG. 13 illustrates an example method 1300, in accordance with at least one embodiment. In various different embodiments, the method 1300 could be performed by any computing and communication device or system of such devices that is suitably equipped, programmed, and configured to perform the operations described herein. In some embodiments, all or part of the method 1300 is performed by the database manager 502, which may involve one or more aspects of the method 1300 being performed by the resource manager 504, one or more aspects of the method 1300 being performed by the execution platform 506, and/or one or more aspects of the method 1300 being performed by one or more other functional components of the database manager 502. By way of example and not limitation, the method 1300 is described below as being performed by the database manager 502 of the database platform 500.

Figure 14:
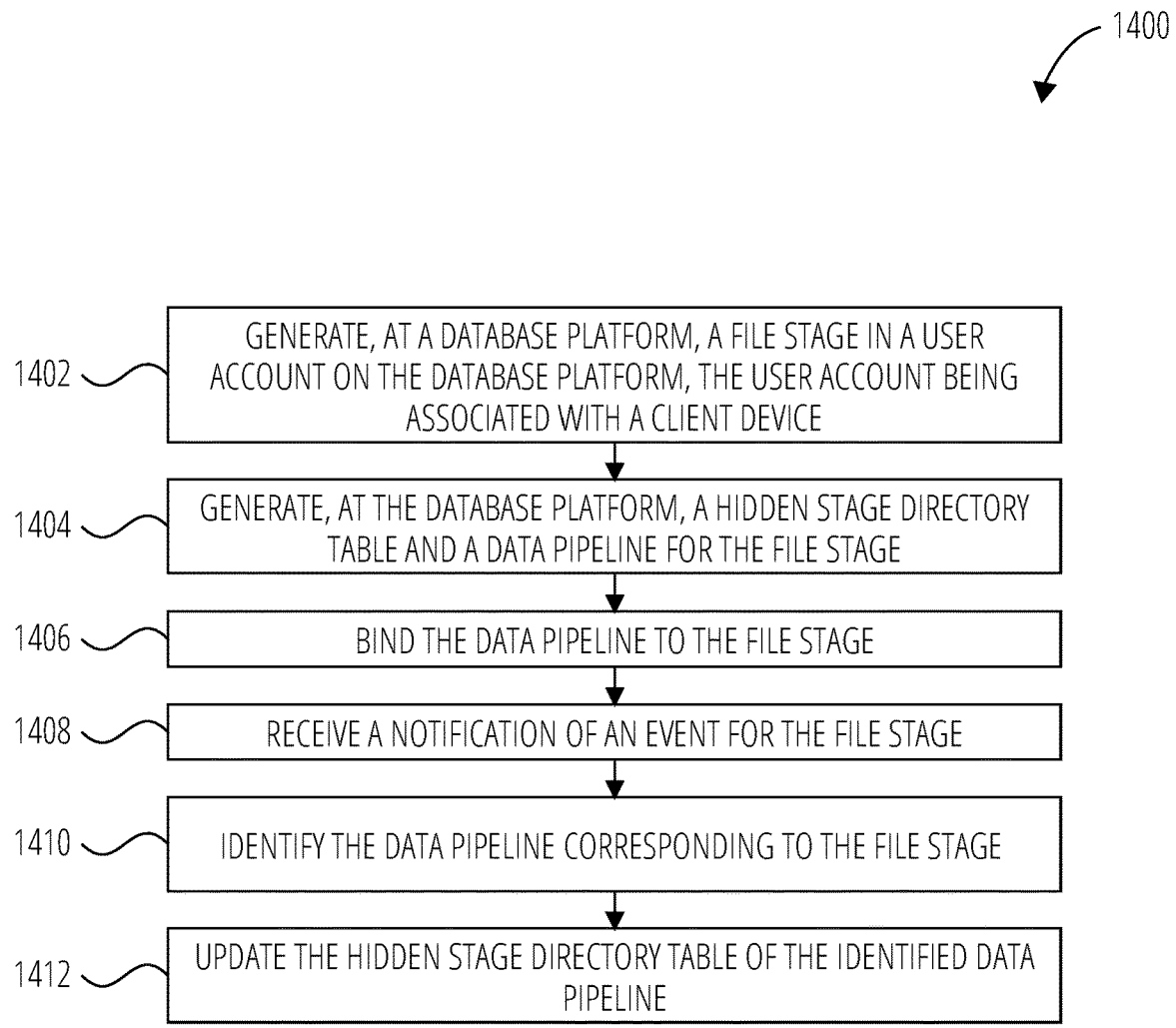
FIG. 14 illustrates a routine 1400 in accordance with one embodiment.

FIG. 14 illustrates a routine 1400 in accordance with one embodiment. In block 1402, routine 1400 generates, at a database platform, a file stage in a user account on the database platform, the user account being associated with a client device. In block 1404, routine 1400 generates, at the database platform, a hidden stage directory table and a data pipeline for the file stage. In block 1406, routine 1400 binds the data pipeline to the file stage. In block 1408, routine 1400 receives a notification of an event for the file stage. In block 1410, routine 1400 identifies the data pipeline corresponding to the file stage. In block 1412, routine 1400 updates the hidden stage directory table of the identified data pipeline.

Figure 15:
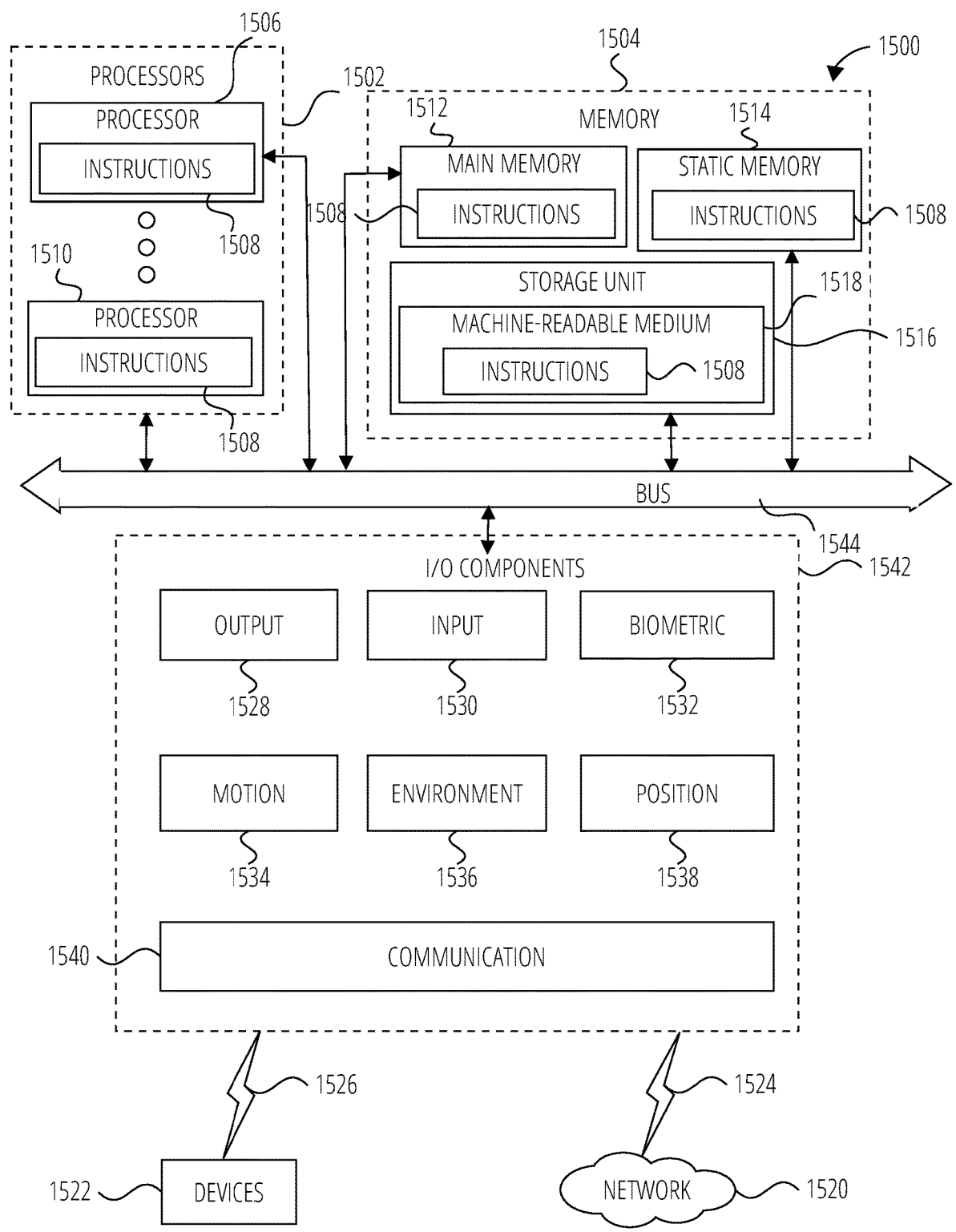
FIG. 15 is a diagrammatic representation of a machine in the form of a computer system within which a set of instructions may be executed for causing the machine to perform any one or more of the methodologies discussed herein, according to an example embodiment.

FIG. 15 is a diagrammatic representation of the machine 1500 within which instructions 1508 (e.g., software, a program, an application, an applet, an app, or other executable code) for causing the machine 1500 to perform any one or more of the methodologies discussed herein may be executed. For example, the instructions 1508 may cause the machine 1500 to execute any one or more of the methods described herein. The instructions 1508 transform the general, non-programmed machine 1500 into a particular machine 1500 programmed to carry out the described and illustrated functions in the manner described. The machine 1500 may operate as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1508, sequentially or otherwise, that specify actions to be taken by the machine 1500. Further, while only a single machine 1500 is illustrated, the term "machine" shall also be taken to include a collection of machines that individually or jointly execute the instructions 1508 to perform any one or more of the methodologies discussed herein.

The machine 1500 may include Processors 1502, memory 1504, and I/O Components 1542, which may be configured to communicate with each other via a bus 1544. In an example embodiment, the Processors 1502 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 1506 and a Processor 1510 that execute the instructions 1508. The term "Processor" is intended to include multi-core Processors that may comprise two or more independent Processors (sometimes referred to as "cores") that may execute instructions contemporaneously. Although FIG. 15 shows multiple Processors 1502, the machine 1500 may include a single Processor with a single core, a single Processor with multiple cores (e.g., a multi-core Processor), multiple Processors with a single core, multiple Processors with multiples cores, or any combination thereof.

The memory 1504 includes a main memory 1512, a static memory 1514, and a storage unit 1516, both accessible to the Processors 1502 via the bus 1544. The main memory 1504, the static memory 1514, and storage unit 1516 store the instructions 1508 embodying any one or more of the methodologies or functions described herein. The instructions 1508 may also reside, completely or partially, within the main memory 1512, within the static memory 1514, within machine-readable medium 1518 within the storage unit 1516, within at least one of the Processors 1502 (e.g., within the Processor's cache memory), or any suitable combination thereof, during execution thereof by the machine 1500.

The I/O Components 1542 may include a wide variety of Components to receive input, provide output, produce output, transmit information, exchange information, capture measurements, and so on. The specific I/O Components 1542 that are included in a particular machine will depend on the type of machine. For example, portable machines such as mobile phones may include a touch input device or other such input mechanisms, while a headless server machine will likely not include such a touch input device. It will be appreciated that the I/O Components 1542 may include many other Components that are not shown in FIG. 15. In various example embodiments, the I/O Components 1542 may include output Components 1528 and input Components 1530. The output Components 1528 may include visual Components (e.g., a display such as a plasma display panel (PDP), a light emitting diode (LED) display, a liquid crystal display (LCD), a projector, or a cathode ray tube (CRT)), acoustic Components (e.g., speakers), haptic Components (e.g., a vibratory motor, resistance mechanisms), other signal generators, and so forth. The input Components 1530 may include alphanumeric input Components (e.g., a keyboard, a touch screen configured to receive alphanumeric input, a photo-optical keyboard, or other alphanumeric input Components), point-based input Components (e.g., a mouse, a touchpad, a trackball, a joystick, a motion sensor, or another pointing instrument), tactile input Components (e.g., a physical button, a touch screen that provides location and/or force of touches or touch gestures, or other tactile input Components), audio input Components (e.g., a microphone), and the like.

In further example embodiments, the I/O Components 1542 may include biometric Components 1532, motion Components 1534, environmental Components 1536, or position Components 1538, among a wide array of other Components. For example, the biometric Components 1532 include Components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion Components 1534 include acceleration sensor Components (e.g., accelerometer), gravitation sensor Components, rotation sensor Components (e.g., gyroscope), and so forth. The environmental Components 1536 include, for example, illumination sensor Components (e.g., photometer), temperature sensor Components (e.g., one or more thermometers that detect ambient temperature), humidity sensor Components, pressure sensor Components (e.g., barometer), acoustic sensor Components (e.g., one or more microphones that detect background noise), proximity sensor Components (e.g., infrared sensors that detect nearby objects), gas sensors (e.g., gas detection sensors to detection concentrations of hazardous gases for safety or to measure pollutants in the atmosphere), or other Components that may provide indications, measurements, or signals corresponding to a surrounding physical environment. The position Components 1538 include location sensor Components (e.g., a GPS receiver Component), altitude sensor Components (e.g., altimeters or barometers that detect air pressure from which altitude may be derived), orientation sensor Components (e.g., magnetometers), and the like.

Communication may be implemented using a wide variety of technologies. The I/O Components 1542 further include communication Components 1540 operable to couple the machine 1500 to a network 1520 or devices 1522 via a coupling 1524 and a coupling 1526, respectively. For example, the communication Components 1540 may include a network interface Component or another suitable device to interface with the network 1520. In further examples, the communication Components 1540 may include wired communication Components, wireless communication Components, cellular communication Components, Near Field Communication (NFC) Components, Bluetooth® Components (e.g., Bluetooth® Low Energy), WiFi® Components, and other communication Components to provide communication via other modalities. The devices 1522 may be another machine or any of a wide variety of peripheral devices (e.g., a peripheral device coupled via a USB).

Moreover, the communication Components 1540 may detect identifiers or include Components operable to detect identifiers. For example, the communication Components 1540 may include Radio Frequency Identification (RFID) tag reader Components, NFC smart tag detection Components, optical reader Components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection Components (e.g., microphones to identify tagged audio signals). In addition, a variety of information may be derived via the communication Components 1540, such as location via Internet Protocol (IP) geolocation, location via Wi-Fi® signal triangulation, location via detecting an NFC beacon signal that may indicate a particular location, and so forth.

The various memories (e.g., memory 1504, main memory 1512, static memory 1514, and/or memory of the Processors 1502) and/or storage unit 1516 may store one or more sets of instructions and data structures (e.g., software) embodying or used by any one or more of the methodologies or functions described herein. These instructions (e.g., the instructions 1508), when executed by Processors 1502, cause various operations to implement the disclosed embodiments.

The instructions 1508 may be transmitted or received over the network 1520, using a transmission medium, via a network interface device (e.g., a network interface Component included in the communication Components 1540) and using any one of a number of well-known transfer protocols (e.g., hypertext transfer protocol (HTTP)). Similarly, the instructions 1508 may be transmitted or received using a transmission medium via the coupling 1526 (e.g., a peer-to-peer coupling) to the devices 1522.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1508 for execution by the machine 1500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

EXAMPLES OF EMBODIMENTS

Following is a list of some examples of embodiments.

Example 1 is a method comprising: generating, at a database platform, a file stage in a user account on the database platform, the user account being associated with a client device; generating, at the database platform, a hidden stage directory table and a data pipeline for the file stage; binding the data pipeline to the file stage; receiving a notification of an event for the file stage; identifying the data pipeline corresponding to the file stage; and updating the hidden stage directory table of the identified data pipeline.

Example 2 includes the method of example 1, further comprising: polling a stage bucket for a put or delete event; detecting a put or delete event; and in response to detecting the put or delete event, routing the notification of the event to a corresponding distributed database (such as a Foundation database (FDB)) queue partition corresponding to the user account.

Example 3 includes the method of example 2, further comprising: processing an Async task queue of the distributed database queue partition as a new ingest notification channel; and directing the notification of the event to a corresponding data pipeline by matching the data pipeline to the event.

Example 4 includes the method of example 1, wherein identifying the data pipeline includes: identifying a distributed database queue partition corresponding to the user account associated with the event.

Example 5 includes the method of example 4, wherein identifying the data pipeline corresponding to the file stage comprises: using a notification channel demodulator configured to split file updates from the distributed database queue partition to the data pipeline.

Example 6 includes the method of example 5, further comprising: using an ingest task executor configured to access a metadata table and metadata files associated with the table metadata of the data pipeline.

Example 7 includes the method of example 6, further comprising: rejecting out-of-order file notifications for updates.

Example 8 includes the method of example 1, wherein the event includes a stage put or delete event.

Example 9 includes the method of example 1, wherein properties of the file stage include a directory attribute and an auto-refresh attribute.

Example 10 includes the method of example 1, wherein the database platform comprises an external stage and an internal stage, a first directory table of the external stage being automatically refreshed in response to a first file event at the external stage, a second directory table of the internal stage being automatically refreshed in response to a second file event at the internal stage, wherein the notification of the event for the file stage indicates the second file event in the internal stage, wherein the external stage is managed by the client device, wherein the internal stage is managed by internally by the database platform exclusive of the user account and the client device.

Example 11 is a computing apparatus comprising: a processor; and a memory storing instructions that, when executed by the processor, configure the apparatus to: generate, at a database platform, a file stage in a user account on the database platform, the user account being associated with a client device; generate, at the database platform, a hidden stage directory table and a data pipeline for the file stage; bind the data pipeline to the file stage; receive a notification of an event for the file stage; identify the data pipeline corresponding to the file stage; and update the hidden stage directory table of the identified data pipeline.

Example 12 includes the computing apparatus of example 11, wherein the instructions further configure the apparatus to: poll a stage bucket for a put or delete event; detect a put or delete event; and in response to detecting the put or delete event, rout the notification of the event to a corresponding distributed database queue partition corresponding to the user account.

Example 13 includes the computing apparatus of example 12, wherein the instructions further configure the apparatus to: process an Async task queue of the distributed database queue partition as a new ingest notification channel; and direct the notification of the event to a corresponding data pipeline by matching the data pipeline to the event.

Example 14 includes the computing apparatus of example 11, wherein identifying the data pipeline includes: identify a distributed database queue partition corresponding to the user account associated with the event.

Example 15 includes the computing apparatus of example 14, wherein identifying the data pipeline corresponding to the file stage comprises: using a notification channel demodulator configured to split file updates from the distributed database queue partition to the data pipeline.

Example 16 includes the computing apparatus of example 15, wherein the instructions further configure the apparatus to: using an ingest task executor configured to access a metadata table and metadata files associated with the table metadata of the data pipeline.

Example 17 includes the computing apparatus of example 16, wherein the instructions further configure the apparatus to: reject out-of-order file notifications for updates.

Example 18 includes the computing apparatus of example 11, wherein the event includes a stage put or delete event.

Example 19 includes the computing apparatus of example 11, wherein properties of the file stage include a directory attribute and an auto-refresh attribute.

Example 20 is a non-transitory computer-readable storage medium, the computer-readable storage medium including instructions that when executed by a computer, cause the computer to: generate, at a database platform, a file stage in a user account on the database platform, the user account being associated with a client device; generate, at the database platform, a hidden stage directory table and a data pipeline for the file stage; bind the data pipeline to the file stage; receive a notification of an event for the file stage; identify the data pipeline corresponding to the file stage; and update the hidden stage directory table of the identified data pipeline.

CONCLUSION

To promote an understanding of the principles of the present disclosure, various embodiments are illustrated in the drawings. The embodiments disclosed herein are not intended to be exhaustive or to limit the present disclosure to the precise forms that are disclosed in the above detailed description. Rather, the described embodiments have been selected so that others skilled in the art may utilize their teachings. Accordingly, no limitation of the scope of the present disclosure is thereby intended.

In any instances in this disclosure, including in the claims, in which numeric modifiers such as first, second, and third are used in reference to components, data (e.g., values, identifiers, parameters, and/or the like), and/or any other elements, such use of such modifiers is not intended to denote or dictate any specific or required order of the elements that are referenced in this manner. Rather, any such use of such modifiers is intended to assist the reader in distinguishing elements from one another, and should not be interpreted as insisting upon any particular order or carrying any other significance, unless such an order or other significance is clearly and affirmatively explained herein.

Moreover, consistent with the fact that the entities and arrangements that are described herein, including the entities and arrangements that are depicted in and described in connection with the drawings, are presented as examples and not by way of limitation, any and all statements or other indications as to what a particular drawing "depicts," what a particular element or entity in a particular drawing or otherwise mentioned in this disclosure "is" or "has," and any and all similar statements that are not explicitly self-qualifying by way of a clause such as "In at least one embodiment," and that could therefore be read in isolation and out of context as absolute and thus as a limitation on all embodiments, can only properly be read as being constructively qualified by such a clause. It is for reasons akin to brevity and clarity of presentation that this implied qualifying clause is not repeated ad nauseum in this disclosure.

In the present disclosure, various terminology is used in accordance with provided definitions. Furthermore, it is noted in connection with the definitions set out herein that the defined terms and phrases as used herein include the provided definitions along with any general and conventional understandings of the meaning of the respective terms and phrases.

It is further noted that, as used in this specification and in the appended claims, the singular forms "a," "an," and "the" include plural referents unless the context clearly dictates otherwise.

As used herein, the terms "comprising," "including," "containing," "characterized by," and grammatical equivalents thereof are inclusive, open-ended terms that do not exclude additional, unrecited elements, method steps, or the like.

Many of the functional units described in this specification may be implemented as one or more components, which is a term used to more particularly emphasize their implementation independence. For example, a component may be implemented as a hardware circuit including custom very large-scale integration (VLSI) circuits or gate arrays, off-the-shelf semiconductors such as logic chips, transistors, and/or other discrete components. A component may also be implemented in programmable hardware devices such as field programmable gate arrays (FPGAs), programmable array logic, programmable logic devices, and/or the like.

Components may also be implemented in software for execution on various types of hardware (e.g., by various types of processors). An identified component of executable code may, for instance, include one or more physical or logical blocks of computer instructions, which may, for instance, be organized as an object, a procedure, or a function. Nevertheless, the executable instructions of an identified component need not be physically located together but may include disparate instructions stored in different locations that, when joined logically together, make up the component and achieve the stated purpose for the component.

Indeed, a component of executable code may be a single instruction, or many instructions, and may be distributed over several different code segments, among different programs, and across several memory devices. Similarly, operational data may be identified and illustrated herein within components and may be embodied in any suitable form and organized within any suitable type of data structure. The operational data may be collected as a single data set or may be distributed over different locations including over different storage devices, and may exist, at least partially, merely as electronic signals on a system or network. The components may be passive or active, including agents operable to perform desired functions.

Reference throughout this specification to "an example" means that a feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the claims.

What is claimed is:

1. A method comprising:
    storing unstructured data in an external stage of a database platform and in an internal stage of the database platform;
    generating, at a database platform, a file stage of the internal stage in a user account on the database platform based on file stage properties attributes indicating an auto-refresh setting enabled, the user account being associated with a client device;
    in response to the auto-refresh setting enabled in the file stage properties attributes, generating, at the database platform, a hidden stage directory table and a data pipeline for the file stage;
    binding the data pipeline to the file stage of the internal stage;
    receiving a notification of an event for the file stage of the internal stage;
    identifying the data pipeline corresponding to the file stage of the internal stage; and
    updating, without receiving an internal stage directory refresh command from a user account, the hidden stage directory table of the data pipeline with metadata extracted from files stored at an internal storage location that is internal to the database platform.

2. The method of claim 1, further comprising:
    polling a stage bucket for a put or delete event;
    detecting a put or delete event; and
    in response to detecting the put or delete event, routing the notification of the event to a corresponding distributed database queue partition corresponding to the user account.

3. The method of claim 2, further comprising:
    processing an Async task queue of the distributed database queue partition as a new ingest notification channel; and
    directing the notification of the event to a corresponding data pipeline by matching the data pipeline to the event.

4. The method of claim 1, wherein identifying the data pipeline includes:
    identifying a distributed database queue partition corresponding to the user account associated with the event.

5. The method of claim 4, wherein identifying the data pipeline corresponding to the file stage comprises:
    splitting file updates from the distributed database queue partition to the data pipeline.

6. The method of claim 5, further comprising:
    accessing a metadata table and metadata files associated with the table metadata of the data pipeline.

7. The method of claim 6, further comprising:
rejecting out-of-order file notifications for updates.

8. The method of claim 1, wherein the event includes a stage put or delete event.

9. The method of claim 1, wherein properties of the file stage include a directory attribute and an auto-refresh attribute.

10. The method of claim 1, wherein a first directory table of the external stage being automatically refreshed in response to a first file event at the external stage, a second directory table of the internal stage being automatically refreshed in response to a second file event at the internal stage, wherein the notification of the event for the file stage indicates the second file event in the internal stage, wherein the external stage is managed by the client device, wherein the internal stage is managed by internally by the database platform exclusive of the user account and the client device.

11. A computing apparatus comprising:
a processor; and
a memory storing instructions that, when executed by the processor, configure the apparatus to:
store unstructured data in an external stage of a database platform and in an internal stage of the database platform;
generate, at a database platform, a file stage of the internal stage in a user account on the database platform based on file stage properties attributes indicating an auto-refresh setting enabled, the user account being associated with a client device;
in response to the auto-refresh setting enabled in the file stage properties attributes, generate, at the database platform, a hidden stage directory table and a data pipeline for the file stage;
bind the data pipeline to the file stage of the internal stage;
receive a notification of an event for the file stage of the internal stage;
identify the data pipeline corresponding to the file stage of the internal stage; and
update, without receiving an internal stage directory refresh command from a user account, the hidden stage directory table of the data pipeline with metadata extracted from files stored at an internal storage location that is internal to the database platform.

12. The computing apparatus of claim 11, wherein the instructions further configure the apparatus to:
poll a stage bucket for a put or delete event;
detect a put or delete event; and
in response to detecting the put or delete event, rout the notification of the event to a corresponding distributed database queue partition corresponding to the user account.

13. The computing apparatus of claim 12, wherein the instructions further configure the apparatus to:
process an Async task queue of the distributed database queue partition as a new ingest notification channel; and
direct the notification of the event to a corresponding data pipeline by matching the data pipeline to the event.

14. The computing apparatus of claim 11, wherein identifying the data pipeline includes:
identify a distributed database queue partition corresponding to the user account associated with the event.

15. The computing apparatus of claim 14, wherein identifying the data pipeline corresponding to the file stage comprises:
splitting file updates from the distributed database queue partition to the data pipeline.

16. The computing apparatus of claim 15, wherein the instructions further configure the apparatus to:
accessing a metadata table and metadata files associated with the table metadata of the data pipeline.

17. The computing apparatus of claim 16, wherein the instructions further configure the apparatus to:
reject out-of-order file notifications for updates.

18. The computing apparatus of claim 11, wherein the event includes a stage put or delete event.

19. The computing apparatus of claim 11, wherein properties of the file stage include a directory attribute and an auto-refresh attribute.

20. A non-transitory computer-readable storage medium, the computer-readable storage medium including instructions that when executed by a computer, cause the computer to:
store unstructured data in an external stage of a database platform and in an internal stage of the database platform;
generate, at a database platform, a file stage of the internal stage in a user account on the database platform based on file stage properties attributes indicating an auto-refresh setting enabled, the user account being associated with a client device;
in response to the auto-refresh setting enabled in the file stage properties attributes, generate, at the database platform, a hidden stage directory table and a data pipeline for the file stage;
bind the data pipeline to the file stage of the internal stage;
receive a notification of an event for the file stage of the internal stage;
identify the data pipeline corresponding to the file stage of the internal stage; and
update, without receiving an internal stage directory refresh command from a user account, the hidden stage directory table of the data pipeline with metadata extracted from files stored at an internal storage location that is internal to the database platform.

* * * * *